US012757046B2

(12) United States Patent
Zhang et al.

(10) Patent No.: US 12,757,046 B2
(45) Date of Patent: Oct. 6, 2026

(54) CHANNEL STATE PARAMETER TRANSMISSION METHOD AND COMMUNICATION APPARATUS

(71) Applicant: HUAWEI TECHNOLOGIES CO., LTD., Shenzhen (CN)

(72) Inventors: Yi Zhang, Shanghai (CN); Zhengzheng Xiang, Shanghai (CN); Lei Lu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/595,435

(22) Filed: Mar. 5, 2024

(65) Prior Publication Data

US 2024/0251267 A1 Jul. 25, 2024

Related U.S. Application Data

(63) Continuation of application No. PCT/CN2022/114435, filed on Aug. 24, 2022.

(30) Foreign Application Priority Data

Sep. 14, 2021 (CN) ......................... 202111075615.7

(51) Int. Cl.
*H04W 24/08* (2009.01)
*H04W 4/06* (2009.01)

(52) U.S. Cl.
CPC ............. *H04W 24/08* (2013.01); *H04W 4/06* (2013.01)

(58) Field of Classification Search
CPC ................................ H04W 24/08; H04W 4/06
USPC .......................................................... 370/252
See application file for complete search history.

(56) References Cited

U.S. PATENT DOCUMENTS

2010/0246429 A1* 9/2010 Hwang .................. H04H 20/42 370/312
2013/0195055 A1 8/2013 Zhang et al.
2019/0305911 A1* 10/2019 Sarkis ................... H04L 5/0048

OTHER PUBLICATIONS

Mingfu Li and Cheng-Han Lee: "Design and Analysis of CQI Feedback Reduction Mechanism for Adaptive Multicast IPTV in Wireless Cellular Networks." Feb. 2020, total 13 pages.

(Continued)

*Primary Examiner* — Faisal Choudhury

(57) ABSTRACT

This application provides a channel state parameter transmission method and a communication apparatus. The method includes: A first terminal apparatus receives first indication information from a communication apparatus, where the first indication information indicates a first channel state parameter, the first channel state parameter is a minimum value of a channel state parameter corresponding to a first multicast group, the first multicast group includes a plurality of terminal apparatuses that receive same multicast information, and the plurality of terminal apparatuses include the first terminal apparatus; the first terminal apparatus measures a reference signal from the communication apparatus, to obtain a second channel state parameter; and the first terminal apparatus sends second indication information to the communication apparatus if the second channel state parameter is less than the first channel state parameter, where the second indication information indicates the second channel state parameter, so as to improve reliability of multicast communication.

20 Claims, 6 Drawing Sheets

(56) References Cited

OTHER PUBLICATIONS

TD-Tech: "MBMS rate control and feedback suppression." 3GPP TSG-RAN WG2#57, St. Louis, USA. Feb. 15-19, 2007. R2-070909, total 4 pages.

* cited by examiner

CHANNEL STATE PARAMETER TRANSMISSION METHOD AND COMMUNICATION APPARATUS

CROSS-REFERENCE TO RELATED APPLICATIONS

This application is a continuation of International Application No. PCT/CN2022/114435, filed on Aug. 24, 2022, which claims priority to Chinese Patent Application Ser. No. 202111075615.7, filed on Sep. 14, 2021. The disclosures of the aforementioned applications are hereby incorporated by reference in their entireties.

TECHNICAL FIELD

This application relates to the communication field, and specifically, to a channel state parameter transmission method and a communication apparatus.

BACKGROUND

In a mobile communication system, a link adaptation manner is used to improve transmission efficiency and reliability of communication data. A receiving end may determine channel state information between the receiving end and a transmitting end by measuring a reference signal sent by the transmitting end, and feed back the channel state information to the transmitting end. The transmitting end may determine, based on the channel state information fed back by the receiving end, a modulation scheme, a coding scheme, and the like of to-be-sent communication data, to implement link adaptation.

Different from point-to-point transmission in unicast communication, point-to-multipoint transmission in multicast communication can reduce resource overheads of common information of a multicast group. In a multicast communication manner, multicast information sent by one transmitting end needs to be received by a plurality of receiving ends. Currently, there is still a lack of a channel state information feedback manner applicable to the multicast communication.

SUMMARY

This application provides a channel state parameter transmission method and a communication apparatus, to improve reliability of multicast communication.

According to a first aspect, a communication method is provided. The method includes: A first terminal apparatus receives first indication information from a communication apparatus, where the first indication information indicates a first channel state parameter, the first channel state parameter is a minimum value of a channel state parameter corresponding to a first multicast group, the first multicast group includes a plurality of terminal apparatuses that receive same multicast information, and the plurality of terminal apparatuses include the first terminal apparatus; the first terminal apparatus measures a reference signal from the communication apparatus, to obtain a second channel state parameter; and the first terminal apparatus sends second indication information to the communication apparatus if the second channel state parameter is less than the first channel state parameter, where the second indication information indicates the second channel state parameter.

According to the foregoing solution, a receiving end of multicast information feeds back, to a transmitting end, a channel state parameter that is less than a minimum value of a channel state parameter corresponding to a multicast group, so that the transmitting end can obtain, in a timely manner, a worst channel state corresponding to the receiving end that is in the multicast group, and update the minimum value of the channel state parameter corresponding to the multicast group. In this way, the transmitting end processes the to-be-sent multicast information based on a current minimum value of the channel state parameter corresponding to the multicast group, so that the multicast information can overcome channel interference of the worst channel state, and all terminal apparatuses in the first multicast group can successfully receive the multicast information. Reliability of multicast communication can be improved.

With reference to the first aspect, in some implementations of the first aspect, before the receiving, by a first terminal apparatus, first indication information from a communication apparatus, the method further includes: The first terminal apparatus sends fourth indication information to the communication apparatus, where the fourth indication information indicates a third channel state parameter, and the third channel state parameter is a channel state parameter that corresponds to the first terminal apparatus and that is obtained through measurement.

Optionally, the method further includes: The first terminal apparatus skips sending the second indication information to the communication apparatus if the second channel state parameter is greater than the first channel state parameter.

According to the foregoing solution, when the channel state parameter obtained by the first terminal apparatus through measurement is greater than the minimum value of the channel state parameter, the receiving end does not feed back the channel state parameter. This can reduce transmission resource overheads, improve resource utilization, and reduce power consumption of the terminal device.

Optionally, the method further includes: The first terminal apparatus sends the second indication information to the communication apparatus if the second channel state parameter is equal to the first channel state parameter.

According to the foregoing solution, when the channel state parameter obtained by the first terminal apparatus through measurement is equal to the minimum value of the channel state parameter, the first terminal apparatus may feed back the channel state parameter to the communication apparatus. In this way, the communication apparatus can update, in a timely manner, a terminal apparatus corresponding to the minimum value of the channel state parameter.

With reference to the first aspect, in some implementations of the first aspect, the method further includes: The first terminal apparatus receives third indication information from the communication apparatus, where the third indication information indicates a first set, the first set is a set of a terminal apparatus corresponding to the first channel state parameter, the first multicast group includes the first set, and the first set does not include the first terminal apparatus.

According to the foregoing solution, the first terminal apparatus may obtain, based on the third indication information, the terminal apparatus that corresponds to the minimum value of the channel state parameter and that is in the first multicast group, and the first terminal apparatus may determine whether the first terminal apparatus is a terminal apparatus corresponding to the minimum value of the channel state parameter.

With reference to the first aspect, in some implementations of the first aspect, before the receiving, by a first terminal apparatus, first indication information from a communication apparatus, the method further includes: The first terminal apparatus sends sixth indication information to the communication apparatus, where the sixth indication information indicates the first channel state parameter, and the first channel state parameter is a channel state parameter that corresponds to the first terminal apparatus and that is obtained through measurement.

Optionally, the method further includes: The first terminal apparatus sends the second indication information to the communication apparatus if the second channel state parameter is greater than the first channel state parameter.

According to the foregoing solution, when the first terminal apparatus is a terminal apparatus corresponding to the minimum value of the channel state parameter, when the channel state parameter obtained by the first terminal apparatus through measurement is greater than the minimum value of the channel state parameter, the first terminal apparatus may feed back the channel state parameter obtained through measurement to the communication apparatus, so that the communication apparatus can update, in a timely manner, the minimum value of the channel state parameter corresponding to the first multicast group. In this way, efficiency of link adaptation is improved and reliability of communication is improved.

Optionally, the method further includes: The first terminal apparatus skips sending the second indication information to the communication apparatus if the second channel state parameter is equal to the first channel state parameter.

According to the foregoing solution, when the channel state parameter obtained by the first terminal apparatus through measurement does not change, the first terminal apparatus may not feed back the channel state parameter to the communication apparatus. This can reduce transmission resource overheads, improve resource utilization, and reduce power consumption of the terminal apparatus.

With reference to the first aspect, in some implementations of the first aspect, the method further includes: The first terminal apparatus receives fifth indication information from the communication apparatus, where the fifth indication information indicates a second set, the second set is a set of a terminal apparatus corresponding to the first channel state parameter, the first multicast group includes the second set, and the second set includes the first terminal apparatus.

According to the foregoing solution, the first terminal apparatus may obtain, based on the fifth indication information, the terminal apparatus that corresponds to the minimum value of the channel state parameter and that is in the first multicast group, so that the first terminal apparatus may determine whether the first terminal apparatus is the terminal apparatus corresponding to the minimum value of the channel state parameter.

With reference to the first aspect, in some implementations of the first aspect, the channel state parameter includes one or more of the following: a channel quality indicator (channel quality indicator, CQI), reference signal strength indication information (reference signal strength indication, RSSI), or reference signal received power (reference signal received power, RSRP).

With reference to the first aspect, in some implementations of the first aspect, indication information for indicating the channel state parameter is carried in uplink control information (uplink control information, UCI), sidelink control information (sidelink control information, SCI), or a physical sidelink shared channel (physical sidelink shared channel, PSSCH).

With reference to the first aspect, in some implementations of the first aspect, indication information for indicating the minimum value of the channel state parameter corresponding to the first multicast group is carried in one or more of the following messages:

- a radio resource control (radio resource control, RRC) message, a media access control (media access control, MAC) control element (control element, CE), downlink control information (downlink control information, DCI), or SCI.

According to a second aspect, a communication method is provided. The method includes:

A communication apparatus sends first indication information to a first multicast group, where the first indication information indicates a first channel state parameter, the first channel state parameter is a minimum value of a channel state parameter corresponding to the first multicast group, and the first multicast group includes a plurality of terminal apparatuses that receive same multicast information; and

- the communication apparatus receives second indication information from a first terminal apparatus, where the second indication information indicates a second channel state parameter, the second channel state parameter is less than the first channel state parameter, and the plurality of terminal apparatuses include the first terminal apparatus.

With reference to the second aspect, in some implementations of the second aspect, the method further includes:

The communication apparatus sends multicast information to the first multicast group, where a modulation scheme and/or a coding scheme of the multicast information is determined based on the minimum value of the channel state parameter corresponding to the first multicast group.

With reference to the second aspect, in some implementations of the second aspect, before the sending, by a communication apparatus, first indication information to a first multicast group, the method further includes:

The communication apparatus receives a plurality of pieces of indication information from the first multicast group, where one of the plurality of pieces of indication information indicates a channel state parameter corresponding to one terminal apparatus that is in the first multicast group, and the first channel state parameter is a minimum value of channel state parameters indicated by the plurality of pieces of indication information.

With reference to the second aspect, in some implementations of the second aspect, the plurality of pieces of indication information include fourth indication information from the first terminal apparatus, the fourth indication information indicates a third channel state parameter, and the method further includes: The communication apparatus sends third indication information to the first terminal apparatus, where the third indication information indicates a first set, the first set is a set of a terminal apparatus corresponding to the first channel state parameter, the first multicast group includes the first set, and the first set does not include the first terminal apparatus.

With reference to the second aspect, in some implementations of the second aspect, the plurality of pieces of indication information include fourth indication information from the first terminal apparatus, the fourth indication information indicates a third channel state parameter, and the method further includes: The communication apparatus receives seventh indication information from the first terminal apparatus, where the seventh indication information indicates a fourth channel state parameter, and the fourth channel state parameter is equal to the first channel state parameter.

With reference to the second aspect, in some implementations of the second aspect, the plurality of pieces of indication information include sixth indication information from the first terminal apparatus, the sixth indication information indicates the first channel state parameter, and the method further includes: The communication apparatus sends fifth indication information to the first terminal apparatus, where the fifth indication information indicates a second set, the second set is a set of a terminal apparatus corresponding to the first channel state parameter, the first multicast group includes the second set, and the second set includes the first terminal apparatus.

With reference to the second aspect, in some implementations of the second aspect, the plurality of pieces of indication information include sixth indication information from the first terminal apparatus, the sixth indication information indicates the first channel state parameter, and the method further includes: The communication apparatus receives eighth indication information from the first terminal apparatus, where the eighth indication information indicates a fifth channel state parameter, and the fifth channel state parameter is greater than the first channel state parameter.

With reference to the second aspect, in some implementations of the second aspect, the method further includes:

The communication apparatus determines a second multicast group based on the first multicast group, where the first multicast group includes the second multicast group, and the second multicast group does not include a second terminal apparatus that is in the first multicast group; and the communication apparatus determines, based on a channel state parameter corresponding to a terminal apparatus that is in the second multicast group, a minimum value of the channel state parameter corresponding to the second multicast group, if a channel state parameter corresponding to the second terminal apparatus is the minimum value of the channel state parameters corresponding to the first multicast group, and the terminal apparatus in the second multicast group does not correspond to the minimum value of the channel state parameter of the first multicast group.

Optionally, the determining, by the communication apparatus, a second multicast group based on the first multicast group includes:

The communication apparatus removes the second terminal apparatus from the first multicast group, to obtain the second multicast group.

With reference to the second aspect, in some implementations of the second aspect, the channel state parameter includes one or more of the following:

a channel quality indicator (CQI), reference signal strength indication information RSSI, or reference signal received power (RSRP).

With reference to the second aspect, in some implementations of the second aspect, indication information for indicating the channel state parameter is carried in uplink control information (UCI), sidelink control information (SCI), or a physical sidelink shared channel (PSSCH).

With reference to the second aspect, in some implementations of the second aspect, indication information for indicating the minimum value of the channel state parameter corresponding to the first multicast group is carried in one or more of the following messages:

downlink control information (DCI), a radio resource control (RRC) message, a media access control control element (MAC CE), a sidelink RRC message, or SCI.

According to a third aspect, a communication apparatus is provided. The apparatus includes: a transceiver unit, configured to receive first indication information from a communication apparatus, where the first indication information indicates a first channel state parameter, the first channel state parameter is a minimum value of a channel state parameter corresponding to a first multicast group, the first multicast group includes a plurality of terminal apparatuses that receive same multicast information, and the plurality of terminal apparatuses include a first terminal apparatus; a processing unit, configured to measure a reference signal from the communication apparatus, to obtain a second channel state parameter; and the transceiver unit is further configured to send second indication information to the communication apparatus when the second channel state parameter is less than the first channel state parameter, where the second indication information indicates the second channel state parameter.

With reference to the third aspect, in some implementations of the third aspect, the processing unit is further configured to skip sending the second indication information to the communication apparatus when the second channel state parameter is greater than the first channel state parameter; and/or the transceiver unit is further configured to send the second indication information to the communication apparatus when the second channel state parameter is equal to the first channel state parameter.

With reference to the third aspect, in some implementations of the third aspect, the transceiver unit is further configured to receive third indication information from the communication apparatus, where the third indication information indicates a first set, the first set is a set of a terminal apparatus corresponding to the first channel state parameter, the first multicast group includes the first set, and the first set does not include the first terminal apparatus.

With reference to the third aspect, in some implementations of the third aspect, before the transceiver unit receives the first indication information from the communication apparatus, the transceiver unit is further configured to send fourth indication information to the communication apparatus, where the fourth indication information indicates a third channel state parameter, and the third channel state parameter is a channel state parameter that corresponds to the first terminal apparatus and that is obtained through measurement.

With reference to the third aspect, in some implementations of the third aspect, the transceiver unit is further configured to send the second indication information to the communication apparatus when the second channel state parameter is greater than the first channel state parameter; and/or the processing unit is further configured to skip sending the second indication information to the communication apparatus when the second channel state parameter is equal to the first channel state parameter.

With reference to the third aspect, in some implementations of the third aspect, the transceiver unit is further configured to receive fifth indication information from the communication apparatus, where the fifth indication information indicates a second set, the second set is a set of a terminal apparatus corresponding to the first channel state parameter, the first multicast group includes the second set, and the second set includes the first terminal apparatus.

With reference to the third aspect, in some implementations of the third aspect, before the transceiver unit receives the first indication information from the communication apparatus, the transceiver unit is further configured to send sixth indication information to the communication apparatus, where the sixth indication information indicates the first channel state parameter, and the first channel state parameter is a channel state parameter that corresponds to the first terminal apparatus and that is obtained through measurement.

With reference to the third aspect, in some implementations of the third aspect, the channel state parameter includes one or more of the following:

a CQI, a RSSI, or RSRP.

With reference to the third aspect, in some implementations of the third aspect, indication information for indicating the channel state parameter is carried in UCI, SCI, or a PSSCH.

With reference to the third aspect, in some implementations of the third aspect, indication information for indicating the minimum value of the channel state parameter corresponding to the first multicast group is carried in one or more of the following messages:

DCI, a RRC message, a MAC CE, a sidelink RRC message, or SCI.

According to a fourth aspect, a communication apparatus is provided. The apparatus includes: a processing unit, configured to determine a first channel state parameter, where the first channel state parameter is a minimum value of a channel state parameter corresponding to a first multicast group, and the first multicast group includes a plurality of terminal apparatuses that receive same multicast information; a transceiver unit, configured to send first indication information to the first multicast group, where the first indication information indicates the first channel state parameter; and the transceiver unit further receives second indication information from a first terminal apparatus, where the second indication information indicates a second channel state parameter, the second channel state parameter is less than the first channel state parameter, and the plurality of terminal apparatuses include the first terminal apparatus.

With reference to the fourth aspect, in some implementations of the fourth aspect, the transceiver unit is further configured to send multicast information to the first multicast group, where a modulation scheme and/or a coding scheme of the multicast information is determined based on the minimum value of the channel state parameter corresponding to the first multicast group.

With reference to the fourth aspect, in some implementations of the fourth aspect, before the transceiver unit sends the first indication information to the first multicast group, the transceiver unit is further configured to receive a plurality of pieces of indication information from the first multicast group, where one of the plurality of pieces of indication information indicates a channel state parameter corresponding to one terminal apparatus that is in the first multicast group, and the first channel state parameter is a minimum value of channel state parameters indicated by the plurality of pieces of indication information.

With reference to the fourth aspect, in some implementations of the fourth aspect, the plurality of pieces of indication information include fourth indication information from the first terminal apparatus, the fourth indication information indicates a third channel state parameter, and the transceiver unit is further configured to send third indication information to the first terminal apparatus, where the third indication information indicates a first set, the first set is a set of a terminal apparatus corresponding to the first channel state parameter, the first multicast group includes the first set, and the first set does not include the first terminal apparatus.

With reference to the fourth aspect, in some implementations of the fourth aspect, the plurality of pieces of indication information include fourth indication information from the first terminal apparatus, the fourth indication information indicates a third channel state parameter, and the transceiver unit is further configured to receive seventh indication information from the first terminal apparatus, where the seventh indication information indicates a fourth channel state parameter, and the fourth channel state parameter is equal to the first channel state parameter.

With reference to the fourth aspect, in some implementations of the fourth aspect, the plurality of pieces of indication information include sixth indication information from the first terminal apparatus, the sixth indication information indicates the first channel state parameter, and the transceiver unit is further configured to send fifth indication information to the first terminal apparatus, where the fifth indication information indicates a second set, the second set is a set of a terminal apparatus corresponding to the first channel state parameter, the first multicast group includes the second set, and the second set includes the first terminal apparatus.

With reference to the fourth aspect, in some implementations of the fourth aspect, the plurality of pieces of indication information include fourth indication information from the first terminal apparatus, the fourth indication information indicates a first channel state parameter, and the transceiver unit is further configured to receive eighth indication information from the first terminal apparatus, where the eighth indication information indicates a fifth channel state parameter, and the fifth channel state parameter is equal to the first channel state parameter. With reference to the fourth aspect, in some implementations of the fourth aspect, the processing unit is further configured to: determine a second multicast group based on the first multicast group, where the first multicast group includes the second multicast group, and the second multicast group does not include a second terminal apparatus that is in the first multicast group; and determine, based on a channel state parameter corresponding to a terminal apparatus that is in the second multicast group, a minimum value of the channel state parameter corresponding to the second multicast group, when a channel state parameter corresponding to the second terminal apparatus is the minimum value of the channel state parameter corresponding to the first multicast group, and the terminal apparatus in the second multicast group does not correspond to the minimum value of the channel state parameter of the first multicast group.

With reference to the fourth aspect, in some implementations of the fourth aspect, the processing unit is configured to remove the second terminal apparatus from the first multicast group, to obtain the second multicast group.

With reference to the fourth aspect, in some implementations of the fourth aspect, the channel state parameter includes one or more of the following:

a CQI, RSSI, or RSRP.

With reference to the fourth aspect, in some implementations of the fourth aspect, indication information for indicating the channel state parameter is carried in UCI, SCI, or a PSSCH.

With reference to the fourth aspect, in some implementations of the fourth aspect, indication information for indicating the minimum value of the channel state parameter corresponding to the first multicast group is carried in one or more of the following messages:

DCI, a RRC message, a MAC CE, a sidelink RRC message, or SCI.

According to a fifth aspect, a terminal apparatus is provided, and includes a processor. The processor may implement the method according to any one of the first aspect and the possible implementations of the first aspect. Optionally, the communication apparatus further includes a memory. The processor is coupled to the memory, and may be configured to execute instructions in the memory, to implement the method according to any one of the first aspect or the possible implementations of the first aspect. Optionally, the communication apparatus further includes a communication interface. The processor is coupled to the communication interface. In embodiments of this application, the communication interface may be a transceiver, a pin, a circuit, a bus, a module, or a communication interface of another type. This is not limited.

In an implementation, the terminal apparatus is a terminal device. When the terminal apparatus is the terminal device, the communication interface may be a transceiver or an input/output interface.

In another implementation, the terminal apparatus is a chip disposed in a terminal device. When the terminal apparatus is the chip disposed in the terminal device, the communication interface may be an input/output interface, and the processor may be a logic circuit.

Optionally, the transceiver may be a transceiver circuit. Optionally, the input/output interface may be an input/output circuit.

According to a sixth aspect, a communication apparatus is provided, and includes a processor. The processor may implement the method according to any one of the second aspect and the possible implementations of the second aspect. Optionally, the communication apparatus further includes a memory. The processor is coupled to the memory, and may be configured to execute instructions in the memory, to implement the method according to any one of the second aspect or the possible implementations of the second aspect. Optionally, the communication apparatus further includes a communication interface. The processor is coupled to the communication interface. In embodiments of this application, the communication interface may be a transceiver, a pin, a circuit, a bus, a module, or a communication interface of another type. This is not limited.

In an implementation, the communication apparatus is a terminal device or a network device. When the communication apparatus is the terminal device or the network device, the communication interface may be a transceiver or an input/output interface.

In another implementation, the communication apparatus is a chip disposed in a terminal device or a network device. When the communication apparatus is the chip disposed in the terminal device or the network device, the communication interface may be an input/output interface, and the processor may be a logic circuit.

Optionally, the transceiver may be a transceiver circuit. Optionally, the input/output interface may be an input/output circuit.

According to a seventh aspect, a processor is provided, and includes an input circuit, an output circuit, and a processing circuit. The processing circuit is configured to: receive a signal via the input circuit, and transmit a signal via the output circuit, so that the processor performs the method in any one of the first aspect or the second aspect and the possible implementations of the first aspect or the second aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, a computer program product is provided. The computer program product includes a computer program (which may also be referred to as code or instructions). When the computer program is run, a computer is enabled to perform the method according to any one of the first aspect or the second aspect and the possible implementations of the first aspect or the second aspect.

According to a ninth aspect, a computer-readable storage medium is provided. The computer-readable storage medium stores a computer program (which may also be referred to as code or instructions). When the computer program is run on a computer, the computer is enabled to perform the method according to any one of the first aspect or the second aspect and the possible implementations of the first aspect or the second aspect.

According to a tenth aspect, a communication system is provided, and includes the foregoing plurality of terminal apparatuses and the foregoing at least one communication apparatus.

DESCRIPTION OF EMBODIMENTS

Figure 1:
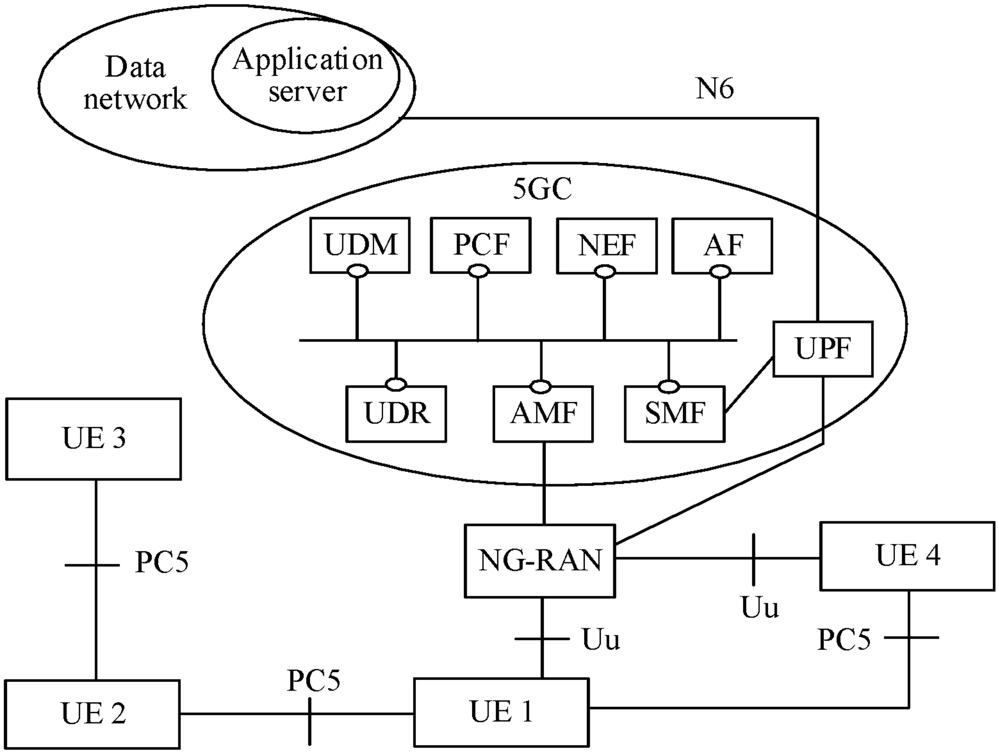
FIG. 1 shows a schematic architecture of a communication system applicable to an embodiment of this application.

The following describes technical solutions of this application with reference to accompanying drawings.

To make the objectives, technical solutions, and advantages of embodiments of this application clearer, the following clearly and completely describes the technical solutions in embodiments of this application with reference to the accompanying drawings in embodiments of this application. It is clear that, the described embodiments are merely a part rather than all of embodiments of this application. All other embodiments obtained by a person of ordinary skill in the art based on embodiments of this application without creative efforts shall fall in the protection scope of this application.

In the specification, the claims, and the accompanying drawings of embodiments of this application, the terms "first", "second", and the like are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, terms "include", "have" and any other variants thereof mean to cover non-exclusive inclusion. For example, a process, a method, a system, a product, or a device that includes a list of steps or units is not necessarily limited to those steps or units that are expressly listed, but may include other steps or units that are not expressly listed or inherent to the process, the method, the product, or the device.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system or a new radio (new radio, NR) system, a vehicle-to-X (vehicle-to-X, V2X) system, a long term evolution-vehicle (LTE-vehicle, LTE-V) system, an internet of vehicles system, a machine type communication (machine type communication, MTC) system, an internet of things (internet of things, IoT) system, a long term evolution-machine (LTE-machine, LTE-M) system, a machine-to-machine (machine-to-machine M2M) system, and a non-terrestrial communication (non-terrestrial network, NTN) system, where V2X may include vehicle-to-network (vehicle-to-network, V2N), vehicle-to-vehicle (vehicle-to-vehicle, V2V), vehicle-to-infrastructure (vehicle-to-infrastructure, V2I), vehicle-to-pedestrian (vehicle-to-pedestrian, V2P), and the like; and the NTN system may also be referred to as a satellite communication system, another future evolved communication system, or the like. This is not limited in this application.

FIG. 1 is a schematic diagram of a system architecture applicable to an embodiment of this application. As shown in FIG. 1, the system architecture may include the following network elements:

1. A terminal device may also be referred to as a user equipment (user equipment, UE), for example, a UE 1, a UE 2, a UE 3, and a UE 4 in FIG. 1. The UE shown in FIG. 1 may perform the method provided in embodiments of this application. However, this application is not limited thereto. A channel state parameter transmission method provided in embodiments of this application may be performed by a terminal apparatus. The terminal apparatus may be the UE, or the terminal apparatus may be disposed in the UE. For example, the terminal apparatus has a processing function, and the terminal apparatus may be an apparatus that can control the UE to perform an operation of receiving and sending communication information. By way of example but not limitation, the terminal apparatus may be a chip.
2. Radio access network (radio access network, RAN) node: A module, an apparatus, a device, or the like that implements an access network function based on a wireless communication technology may be referred to as the RAN node. The RAN node is mainly configured to provide an interface for the UE to wirelessly access a mobile network, can manage a radio resource, and provides an access service for the UE, to complete forwarding of a control signal and user data between the UE and a core network. For example, the RAN node may be a base station, for example, an eNB in a 4G system or a gNB in a 5G system in which a radio access network that is used is a next generation radio access network (next generation radio access network, NG-RAN).

Figure 2:
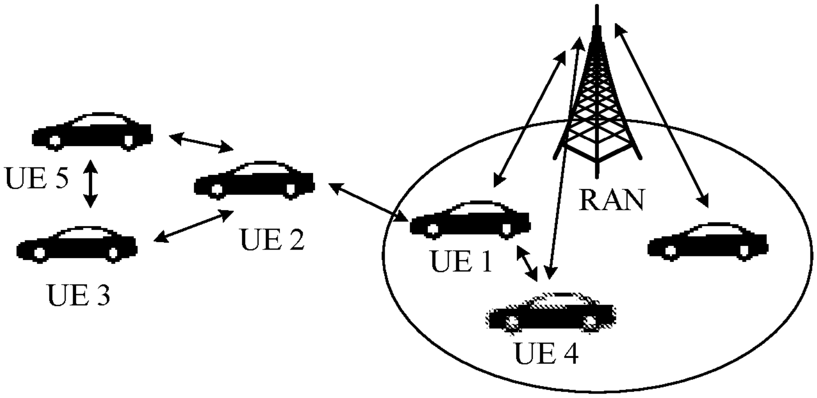
FIG. 2 is a schematic diagram of a communication system applicable to an embodiment of this application.

The UE may establish a communication link to the RAN node, and communicate with the RAN node through a cellular communication interface, namely, a user equipment-universal mobile communication system terrestrial access network (UE-UTRAN, Uu) interface, for example, the UE 1 and the UE 4 shown in FIG. 1. For example, a UE 1 and a UE 4 shown in FIG. 2 may be terminal devices in a coverage range of the RAN node. UEs may also perform direct communication with each other through a direct communication interface, in other words, through a near field service communication (interface) 5 (proximity-based service communication (interface) 5, PC5). As shown in FIG. 1, the UE 1 and the UE 4 and the UE 2, and the UE 2 and the UE 3 may communicate with each other through a PC5 interface. For example, as shown in FIG. 2, UEs that communicate with each other through the PC5 interface may be in the coverage range of the RAN node, for example, the UE 1 and the UE 4, or may be outside the coverage range of the RAN, for example, the UE 2 and the UE 3. Alternatively, for two UEs that communicate with each other through the PC5 interface, one UE is in the coverage area of the RAN node, and the other UE is outside the coverage area of the RAN node, for example, the UE 1 and the UE 2.

In embodiments of this application, the Uu interface may be an interface between a UE and an access network device. The access network device may be a base station in a UMTS, an evolved NodeB (evolved NodeB, eNodeB or eNB) in a 4G network, a next generation base station (next generation node base station, gNodeB, or gNB) in a 5G network, or a base station in a subsequent evolved network. This is not limited. When two or more UEs communicate with each other via an access network node, such communication may be referred to as Uu communication or Uu interface communication for short.

In embodiments of this application, the PC5 interface may be an interface between two UEs, and may be configured to complete signaling and data transmission on a control plane and a user plane, proximity service discovery, direct communication, and the like. The PC5 interface may be used for short-distance direct communication or direct communication between UEs, which may be referred to as PC5 communication, PC5 interface communication, or sidelink communication for short.

3. Access and mobility management function (access and mobility management function, AMF): The AMF is mainly configured to perform mobility management, access management, and the like.
4. Session management function (session management function, SMF): The SMF is mainly configured to perform session management, internet protocol (internet protocol, IP) address allocation and management of the UE, selection of a manageable user plane function, policy control, or a termination point of a charging function interface, downlink data notification, and configuration of routing information for a user plane function.

5. Policy control function (policy control function, PCF): The PCF is configured to: guide a unified policy framework of network behavior, and provide policy rule information for a control plane function network element (such as the AMF network element or the SMF network element).
6. Unified data management (unified data management, UDM): The UDM is configured to perform user identifier processing, access authentication, registration, mobility management, or the like.
7. User plane function (user plane function, UPF): The UPF is configured to perform packet routing and forwarding, quality of service (quality of service, QoS) processing of user plane data, and the like.
8. Application function (application function, AF): The AF mainly supports interaction with a 3rd generation partnership project (3rd generation partnership project, 3GPP) core network to provide a service, for example, affects a data routing decision or a policy control function, or provides some third-party services for a network side.
9. Network exposure function (network exposure function, NEF): The NEF connects a core network element to an external application server, and provides services such as authentication and data forwarding when the external application server initiates a service request to a core network.
10. Data network (data network, DN): The DN is configured to provide a network for transmitting data, for example, an internet network.
11. Unified data repository (unified data repository, UDR): The UDR is configured to: store and retrieve a PCF policy, store and retrieve structured data for exposure, store user information requested by an application function, and the like.

The terminal device in embodiments of this application may be referred to as UE, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer, a computer with a wireless transceiver function, a virtual reality (virtual reality, VR) terminal device, an augmented reality (augmented reality, AR) terminal device, a wireless terminal in industrial control, a wireless terminal in unmanned driving, a wireless terminal in telemedicine, a wireless terminal in a smart grid, a wireless terminal in transportation security, a wireless terminal in a smart city, a wireless terminal in a smart home, a cellular phone, a cordless phone, a session initiation protocol (session initiation protocol, SIP) phone, a wireless local loop (wireless local loop, WLL) station, a personal digital assistant (personal digital assistant, PDA), a handheld device, a computing device, a vehicle-mounted device, a wearable device, a terminal device in a 5G network, or a terminal device in a future evolved public land mobile communication network (public land mobile network, PLMN) that has a wireless communication function, or the like. It should be understood that a specific form of the terminal device is not limited in this application.

The RAN node in embodiments of this application may be a device that has a wireless transceiver function in an access network. The RAN node may also be referred to as a network device or a RAN device. The RAN node includes but is not limited to: a base station, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a radio relay node, a radio backhaul node, a transmission point (transmission point, TP), or a transmission reception point (transmission reception point, TRP).

Alternatively, the device may be a network node that forms a gNB or a transmission point, for example, a baseband unit (BBU) or a distributed unit (distributed unit, DU). It should be understood that a specific form of the network device is not limited in this application.

The following describes related technologies and terms in embodiments of this application.

I. V2X Communication

V2X supports two communication modes: PC5 interface communication and Uu interface communication. The PC5 interface supports sidelink SL communication. A physical channel for NR V2X SL communication includes a physical sidelink control channel (physical sidelink control channel, PSCCH) carrying control information, a PSSCH carrying data load and additional control information, a physical sidelink broadcast channel (physical sidelink broadcast channel, PSBCH) carrying synchronization information, and a physical sidelink feedback channel (physical sidelink feedback channel, PSFCH) carrying feedback information.

On a V2X SL, data is carried on the PSSCH in a form of a transport block (transport block, TB) and is associated with SCI. The SCI indicates a resource used to carry the TB on the PSSCH and information needed to decode the TB. The PSCCH is transmitted along with the PSSCH. SCI transmission includes transmission of SCI of two levels. First-level SCI is carried on the PSCCH, and second-level SCI is carried on the PSSCH. A UE that is not a receiving target needs to decode only the first-level SCI to achieve a perception objective. The second-level SCI includes additional control information for a receiving UE. Introduction of the second-level SCI increases flexibility of SCI design, thereby further supporting unicast, multicast, and broadcast transmission. The first-level SCI includes an indication of a frequency domain resource and a time domain resource of the transmitted TB, an indication of a corresponding PSSCH priority, a format and a size of the second-level SCI, and a modulation and coding scheme (modulation and coding scheme, MCS) corresponding to the data transmitted on the PSSCH. The MCS is indicated by a corresponding MCS index in an MCS table. In the V2X SL, a default MCS table and two additional MCS tables may be configured or preconfigured in each resource pool. To support different channel conditions, a demodulation reference signal (demodulation reference signal, DMRS) of the PSSCH can be carried on different symbols in a PSSCH slot. In the resource pool, a time pattern of the DMRS may be indicated by the first-level SCI.

2. Link Adaptation in V2X SL

The V2X SL uses link adaptation to improve efficiency and reliability of unicast transmission. In a V2X unicast system, link adaptation may be adjusted based on channel state information fed back by a receiving UE to a sending UE. The channel state information may include a CQI, a rank indicator (rank indicator, RI), and the like.

A link adaptation technology can adjust, based on radio link quality, an MCS that is suitable for sending. The data receiving UE determines the CQI by measuring a channel state information reference signal (channel state information-reference signal, CSI-RS) sent by the sending UE on a PSSCH. The CQI may be determined based on a measurement result of measuring the CSI-RS and a corresponding CQI table. The CQI may indicate a highest modulation and coding scheme applicable to a current channel, and a transmitting end UE may select an MCS of to-be-transmitted data based on the CQI.

In unicast transmission in the V2X SL, a quantity of streams for sending a PSSCH in multi-antenna transmission may be further adjusted through rank adaptation, to improve spectral efficiency. The receiving UE may determine, based on channel measurement information of an SL CSI-RS sent from one or more antenna ports of the sending UE, an RI corresponding to a rank of a measured SL channel. A rank of a channel determines a quantity of streams that can be supported by the channel. Currently, PSSCH transmission in the V2X SL supports a maximum of two streams, and the RI may be equal to 1 or 2. However, this application is not limited thereto, and embodiments of this application may also be applied to transmission of a plurality of streams of the PSSCH. The RI may also be determined by the CQI. A combination of the CQI and the RI represents the CSI that can be fed back from the receiving UE to the sending UE, and is used for link and rank adaptation for unicast PSSCH transmission. Currently, the V2X SL does not support precoding matrix indicator (precoding matrix indicator, PMI) feedback, and the sending UE may perform open-loop multi-antenna SL transmission based on the CQI and the RI fed back by the receiving UE. However, this application is not limited thereto, and embodiments of this application may also be applied to a scenario in which the receiving UE feeds back a PMI.

3. Unicast Communication and Multicast Communication

Unicast communication is a point-to-point communication manner between one transmitting end and one receiving end. A signal sent by the transmitting end may include an identifier (namely, an identifier of a source device) of the transmitting end and an identifier of a target receiving end. The target receiving end receives the signal, to implement point-to-point communication. For example, unicast communication may include point-to-point communication between a network device and a terminal device, or point-to-point communication between terminal devices in a V2X SL. However, this application is not limited thereto.

Multicast communication is a point-to-multipoint communication manner between one transmitting end and a plurality of receiving ends. A signal sent by the transmitting end may include an identifier (namely, an identifier of a source device) of the transmitting end and an identifier of a target group. The plurality of receiving ends that belong to the target group receive the signal, to implement point-to-multipoint communication.

For example, the multicast communication may include multicast communication of a network device, namely, point-to-multipoint communication in which the network device sends a multicast signal to a plurality of terminal devices. The network device may allocate a group identifier to the plurality of terminal devices for receiving the multicast signal. For example, a UE 1 and a UE 4 shown in FIG. 2 may belong to a same multicast group, the network device may send a multicast signal that carries a group identifier of the terminal devices, and the UE 1 and the UE 4 receive the multicast signal based on the group identifier.

For another example, the multicast communication may include V2X SL multicast communication, namely, point-to-multipoint communication in which one terminal device sends a multicast signal to a plurality of terminal devices. The sending terminal device and the plurality of receiving terminal devices may belong to a same multicast group, and the receiving terminal device may receive a multicast signal of the multicast group based on an identifier of the multicast group. However, this application is not limited thereto. For example, the UE 1, the UE 2, the UE 3, and a UE 5 shown in FIG. 2 may belong to a same multicast group. The UE 2 sends a multicast signal carrying a group identifier, and the UE 1, the UE 3, and the UE 5 may receive the multicast signal based on the group identifier.

The multicast group may be obtained based on a position of a terminal device or a distance between terminal devices. For example, terminal devices in a same geographical position range are grouped into a same multicast group. Alternatively, terminal devices whose distance from each other is less than a preset threshold are grouped into a same multicast group. Alternatively, a multicast signal transmitting end device (for example, a network device or a terminal device) may obtain a multicast group based on received signal strength of a terminal device. For example, terminal devices whose received signal strength is in a preset range are grouped into a same multicast group. However, this application is not limited thereto.

Currently, a feedback manner of channel state information in unicast communication is mainly considered. For multicast communication, if the feedback manner of channel state information in unicast communication is simply used, when a quantity of receiving ends in multicast communication is large, resource overheads of channel state information are large, and a throughput of system communication data is affected. An anti-interference capability (for example, a modulation scheme or a coding scheme) of a multicast signal sent by a transmitting end is mainly determined by a worst channel state in channel states of a plurality of receiving ends, so that a receiving end with the worst channel state can receive the multicast signal. Therefore, in embodiments of this application, when a channel state parameter obtained through measurement is less than a minimum value of a channel state parameter corresponding to a multicast group, the receiving end in the multicast group feeds back the channel state parameter obtained through measurement to the transmitting end, so that the transmitting end can update the minimum value of the channel state parameter corresponding to the multicast group, and process to-be-sent multicast information based on a current minimum value of the channel state parameter corresponding to a first multicast group, so that a terminal apparatus in the first multicast group can successfully receive the multicast information.

The following describes a communication method provided in embodiments of this application with reference to the accompanying drawings.

Embodiment 1

Figure 3:
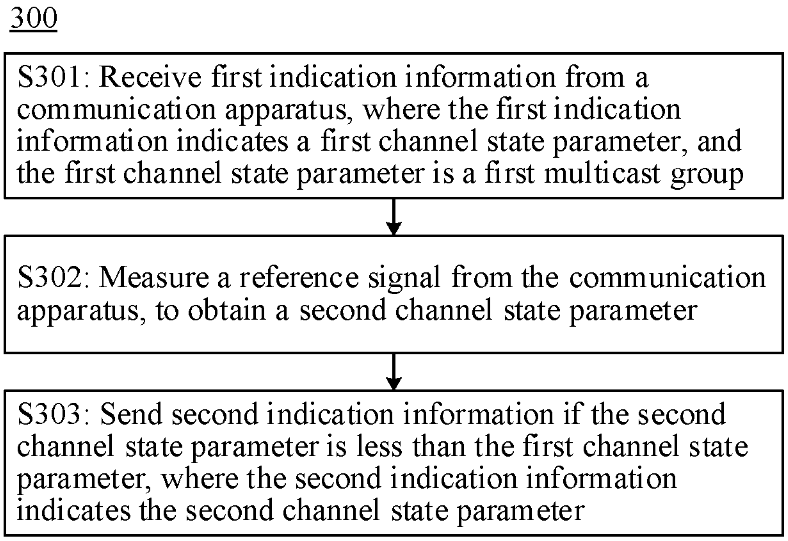
FIG. 3 is a schematic flowchart of a channel state parameter transmission method according to Embodiment 1 of this application.

FIG. 3 is a schematic flowchart of a communication method 300 according to an embodiment of this application. The communication method shown in FIG. 3 may be executed by a first terminal apparatus, and the first terminal apparatus belongs to a first multicast group. In the embodiment shown in FIG. 3, a communication apparatus is a sending apparatus that sends multicast information to the first multicast group. The first multicast group includes N terminal apparatuses that receive same multicast information. In other words, in a point-to-multipoint multicast communication manner, the communication apparatus is used as the sending apparatus of the multicast information, and the N terminal apparatuses are used as receiving apparatuses of the multicast information. The communication apparatus sends one piece of multicast information, and all the N terminal apparatuses in the first multicast group need to receive the multicast information. N is a positive integer, and the N terminal apparatuses include the first terminal apparatus.

It should be noted that the terminal apparatus provided in this embodiment of this application may be disposed in a terminal device, or the terminal apparatus may be the terminal device. The communication apparatus may be an access network apparatus, or may be a terminal apparatus. This is not limited in this application. The access network apparatus may be disposed in a RAN node, or the access network apparatus may be the RAN node.

S301: The first terminal apparatus receives first indication information from the communication apparatus, where the first indication information indicates a first channel state parameter, and the first channel state parameter is a minimum value of a channel state parameter corresponding to the first multicast group.

The communication apparatus may determine, based on a channel state parameter corresponding to the terminal apparatus that is in the first multicast group, the minimum value of the channel state parameter corresponding to the first multicast group, namely, a minimum value of the channel state parameter corresponding to the terminal apparatus that is in the first multicast group.

Optionally, the communication apparatus receives N pieces of indication information from the first multicast group, where one of the N pieces of indication information indicates a channel state parameter corresponding to one terminal apparatus that is in the first multicast group.

The N pieces of indication information may be sent by the N terminal apparatuses to the communication apparatus at a same moment or different moments. This is not limited in this application.

The communication apparatus may determine, based on the N pieces of indication information, channel state parameters corresponding to the N terminal apparatuses that are in the first multicast group, and determine a minimum value of the channel state parameters corresponding to the N terminal apparatuses as the first channel state parameter. Therefore, the minimum value of the channel state parameter corresponding to the first multicast group is the first channel state parameter.

By way of example but not limitation, the channel state parameter includes but is not limited to one of a CQI, an RSSI, or RSRP, or the channel state parameter includes two or all of the CQI, the RSSI, or the RSRP.

It should be noted that the channel state parameter corresponding to the terminal apparatus is a parameter for representing a channel state between the terminal apparatus and the communication apparatus. The terminal apparatus may measure a reference signal from the communication apparatus to obtain channel information, and determine, based on the channel information, a channel state parameter corresponding to the terminal apparatus. The channel state parameter may represent the channel state between the terminal apparatus and the communication apparatus. A larger channel state parameter represents a better channel state, and a smaller channel state parameter represents a poorer channel state.

Optionally, the N pieces of indication information may be CSI sent by the N terminal apparatuses to the communication device, and each piece of CSI includes the channel state parameter corresponding to the terminal apparatus.

Optionally, the indication information for indicating the channel state parameter may be carried in UCI, SCI, or a PSSCH sent by the terminal apparatus.

The communication apparatus sends the first indication information to the first multicast group. The minimum value, namely, the first channel state parameter, of the channel state parameter corresponding to the first multicast group is notified via the first indication information.

The communication apparatus may determine, based on the minimum value of the channel state parameter corresponding to the first multicast group, a modulation scheme, a coding scheme, and/or the like of multicast information sent to the first multicast group. In this way, the terminal apparatus in the first multicast group can successfully receive the multicast information.

By way of example but not limitation, the multicast information may include multicast control information, multicast service data, and/or the like.

The terminal apparatus in the first multicast group receives the first indication information from the communication apparatus, and determines, based on the first indication information, that the minimum value of the channel state parameter corresponding to the first multicast group is the first channel state parameter. The terminal apparatus may determine, based on the minimum value of the channel state parameter corresponding to the first multicast group, whether to send a channel state parameter obtained through measurement.

Optionally, the first indication information may be one or more of the following:

an RRC message, a MAC CE, DCI, or SCI.

By way of example but not limitation, the first indication information may be the multicast information.

S302: The first terminal apparatus measures the reference signal from the communication apparatus, to obtain a second channel state parameter.

The first terminal apparatus may periodically or semi-statically measure the reference signal from the communication apparatus, to obtain the channel state parameter. Alternatively, the first terminal apparatus may be triggered by the communication apparatus (where for example, the first terminal apparatus is triggered by indication information sent to the first terminal apparatus), to measure the reference signal of the communication apparatus once. However, this application is not limited thereto.

By way of example but not limitation, the reference signal of the communication apparatus may include but is not limited to one or more of the following:

a CSI-RS, a synchronization signal (synchronization signal, SS) and physical broadcast channel (physical broadcast channel, PBCH) block SSB, or a demodulation reference signal (demodulation reference signal, DMRS).

For example, the terminal apparatus may measure a reference signal from the communication apparatus to obtain channel information, and determine, based on the channel information, a channel state parameter corresponding to the terminal apparatus. The channel state parameter may represent the channel state between the terminal apparatus and the communication apparatus. For example, the channel state parameter is the CQI. The terminal apparatus measures the reference signal to obtain the channel information, for example, information that is for representing a channel feature, such as a channel path loss and a delay spread. The terminal apparatus determines, based on the channel information, a CQI applicable to a channel, where the CQI indicates one or more of a modulation order, a channel coding code rate, or coding efficiency applicable to the channel.

S303: The first terminal apparatus sends second indication information to the communication apparatus if the second channel state parameter is less than the first channel state parameter, where the second indication information indicates the second channel state parameter.

Correspondingly, the communication apparatus receives the second indication information from the first terminal apparatus. The communication apparatus may determine, based on the second indication information, that the channel state parameter corresponding to the first terminal apparatus is changed to the second channel state parameter. In addition, the communication apparatus may determine, based on the current channel state parameter corresponding to the terminal apparatus that is in the first multicast group, the minimum value of the channel state parameter corresponding to the first multicast group. If only the channel state parameter corresponding to the first terminal apparatus is changed to the second channel state parameter, the communication apparatus may determine that the minimum value of the channel state parameter corresponding to the first multicast group is changed to the second channel state parameter, and notify the terminal apparatus that is in the first multicast group.

According to the foregoing solution, a receiving end of the multicast information feeds back, to a transmitting end, a channel state parameter that is less than the minimum value of the channel state parameter corresponding to the multicast group, so that the transmitting end can obtain, in a timely manner, the worst channel state corresponding to the receiving end that is in the multicast group, and update the minimum value of the channel state parameter corresponding to the multicast group. In this way, the transmitting end processes the to-be-sent multicast information based on a minimum value of the channel state parameter corresponding to the multicast group, so that the multicast information can overcome channel interference of the worst channel state, and all terminal apparatuses in the first multicast group can successfully receive the multicast information. Reliability of multicast communication can be improved.

Optionally, the second channel state parameter is greater than or equal to the first channel state parameter, and the first terminal apparatus may determine, based on two cases in which the first terminal apparatus is or is not a terminal apparatus corresponding to the first channel state parameter, whether to send the second indication information.

Case 1: The first terminal apparatus is not the terminal apparatus corresponding to the first channel state parameter.

Optionally, the first terminal apparatus does not send the second indication information to the communication apparatus if the second channel state parameter is greater than the first channel state parameter.

If the first terminal apparatus is not the terminal apparatus corresponding to the first channel state parameter, when the channel state parameter obtained by the first terminal apparatus through measurement is greater than the first channel state parameter, it may be considered that the minimum value of the channel state parameter corresponding to the first multicast group does not change, and a processing manner in which the communication apparatus determines the to-be-sent multicast information is not affected. Therefore, in embodiments of this application, the first terminal apparatus does not send the second indication information to the communication apparatus, and does not notify the second channel state parameter. This can reduce transmission resource overheads, improve resource utilization, and reduce power consumption of the terminal apparatus.

Optionally, the first terminal apparatus sends the second indication information to the communication apparatus if the second channel state parameter is equal to the first channel state parameter.

If the first terminal apparatus is not the terminal apparatus corresponding to the first channel state parameter, the first terminal apparatus may notify the communication apparatus based on the second indication information when the channel state parameter obtained through measurement is equal to the minimum value of the channel state parameter corresponding to the first multicast group, so that the communication apparatus determines the terminal apparatus corresponding to the minimum value of the channel state parameter.

The first terminal apparatus may determine, based on but not limited to the following implementations, that the first terminal apparatus is not the terminal apparatus corresponding to the first channel state parameter.

In an implementation, the first terminal apparatus may determine, based on a channel state parameter last sent by the first terminal apparatus to the communication apparatus, that the first terminal apparatus is not the terminal apparatus corresponding to the first channel state parameter.

For example, before the first terminal apparatus receives the first indication information, the first terminal apparatus sends fourth indication information to the communication apparatus, where the fourth indication information indicates a third channel state, and the third channel state is a channel state parameter that corresponds to the first terminal apparatus and that is obtained through measurement.

For example, the N pieces of indication information include the fourth indication information. After receiving the first indication information, the first terminal apparatus may determine that the third channel state parameter that is last sent is not equal to the first channel state parameter, and then the first terminal apparatus determines that the first terminal apparatus is not the terminal apparatus corresponding to the first channel state parameter.

In another implementation, the first terminal apparatus may determine, based on a set of a terminal apparatus corresponding to the minimum value that is of the channel state parameter and that is indicated by the communication apparatus, that the first terminal apparatus is not the terminal apparatus corresponding to the first channel state parameter.

For example, the communication apparatus sends third indication information to the first multicast group, where the third indication information indicates a first set, the first set is the set of the terminal apparatus corresponding to the first channel state parameter, the first multicast group includes the first set, and the first set does not include the first terminal apparatus.

Correspondingly, the first terminal apparatus receives the third indication information, and determines, based on the first set, that the first terminal apparatus is not the terminal apparatus corresponding to the first channel state parameter.

Optionally, the third indication information includes identification information of the terminal apparatus corresponding to the first channel state parameter.

The terminal apparatus in the first multicast group may determine the first set based on the identification information that is of the terminal apparatus and that is indicated by the third indication information.

The first indication information and the third indication information that are sent by the communication apparatus to the first multicast group may be carried in a same multicast message and sent to the first multicast group, or may be carried in different messages and sent to the first multicast group. This is not limited in this application.

Case 2: A second terminal apparatus is the terminal apparatus corresponding to the first channel state parameter.

Optionally, the first terminal apparatus sends the second indication information to the communication apparatus if the second channel state parameter is greater than the first channel state parameter.

The first terminal apparatus is the terminal apparatus corresponding to the first channel state parameter. When the channel state parameter obtained by the first terminal apparatus through measurement is greater than the first channel state parameter, it may be considered that the minimum value of the channel state parameter may change. The first terminal apparatus needs to send the second indication information to the communication apparatus, so that the communication apparatus determines whether the minimum value of the channel state parameter changes, to update the minimum value of the channel state parameter.

For example, the first terminal apparatus sends the second indication information to the communication apparatus if the second channel state parameter is greater than the first channel state parameter. After receiving the second indication information, the communication apparatus determines that the channel state parameter corresponding to the first terminal apparatus is updated to the second channel state parameter, and the communication apparatus determines a minimum value of the channel state parameter based on a current channel state parameter corresponding to the first multicast group. If the first multicast group further includes at least one terminal apparatus corresponding to the first channel state parameter, and the first channel state parameter is the minimum value, the minimum value of the channel state parameter corresponding to the first multicast group is still the first channel state parameter. If the first multicast group does not include a terminal apparatus corresponding to the first channel state parameter, the communication apparatus may determine a current minimum value of the channel state parameter corresponding to the first multicast group, and notify the first multicast group.

Optionally, the first terminal apparatus does not send the second indication information to the communication apparatus if the second channel state parameter is equal to the first channel state parameter.

In other words, when the channel state parameter corresponding to the first terminal apparatus does not change, the first terminal apparatus does not send the second indication information to the communication apparatus. This can reduce transmission resource overheads, improve resource utilization, and reduce power consumption of the terminal apparatus.

The first terminal apparatus may determine, based on but not limited to the following implementations, that the first terminal apparatus is the terminal apparatus corresponding to the first channel state parameter.

In an implementation, the first terminal apparatus may determine, based on a channel state parameter last sent by the first terminal apparatus to the communication apparatus, that the first terminal apparatus is the terminal apparatus corresponding to the first channel state parameter.

For example, before the first terminal apparatus receives the first indication information, the first terminal apparatus sends sixth indication information to the communication apparatus, where the sixth indication information indicates the first channel state, and the first channel state is a channel state parameter that corresponds to the first terminal apparatus and that is obtained through measurement.

For example, the N pieces of indication information include the sixth indication information. After receiving the first indication information, the first terminal apparatus may determine that the first channel state parameter is last sent, and the first terminal apparatus determines that the first terminal apparatus is the terminal apparatus corresponding to the first channel state parameter.

In another implementation, the first terminal apparatus may determine, based on a set of a terminal apparatus corresponding to the minimum value that is of the channel state parameter and that is indicated by the communication apparatus, that the first terminal apparatus is the terminal apparatus corresponding to the first channel state parameter.

For example, the communication apparatus sends fifth indication information to the first multicast group, where the fifth indication information indicates a second set, the second set is a set of a terminal apparatus corresponding to the first channel state parameter, the first multicast group includes the second set, and the second set includes the first terminal apparatus.

Correspondingly, the first terminal apparatus receives the fifth indication information, and determines, based on the second set, that the first terminal apparatus is the terminal apparatus corresponding to the first channel state parameter.

The first indication information and the fifth indication information that are sent by the communication apparatus to the first multicast group may be carried in a same multicast message and sent to the first multicast group, or may be carried in different messages and sent to the first multicast group. This is not limited in this application.

Optionally, the communication apparatus determines a second multicast group based on the first multicast group, where the first multicast group includes the second multicast group, and the second multicast group does not include a second terminal apparatus that is in the first multicast group. The communication apparatus determines, based on a channel state parameter corresponding to a terminal apparatus that is in the second multicast group, a minimum value of the channel state parameter corresponding to the second multicast group, if the channel state parameter corresponding to the second terminal apparatus is the minimum value of the channel state parameter corresponding to the first multicast group, and the second multicast group does not include a terminal apparatus corresponding to the minimum value of the channel state parameter of the first multicast group.

For example, the second terminal apparatus needs to leave the multicast group. The leaving of the second terminal apparatus from the multicast group may be determined by the communication apparatus based on a service. For example, the communication apparatus no longer provides a multicast service for the second terminal apparatus. Alternatively, the leaving of the second terminal apparatus from the multicast group may be determined by the communication apparatus based on a position of the second terminal apparatus. For example, the position of the second terminal apparatus is outside a coverage range of the multicast information sent by the communication apparatus, but this application is not limited thereto. The communication apparatus removes the second terminal apparatus from the first multicast group, to obtain the second multicast group, where the second multicast group includes a plurality of terminal apparatuses. If the channel state parameter corresponding to the second terminal apparatus is the first channel state parameter, in other words, the terminal apparatus corresponding to the minimum value of the channel state parameter of the multicast group is removed from the multicast group, the communication apparatus needs to determine whether to re-determine the minimum value of the channel state parameter. If the second multicast group includes a terminal apparatus corresponding to the first channel state parameter, the first channel state parameter is still the minimum value of the channel state parameter corresponding to the second multicast group. If the second multicast group does not include a terminal apparatus corresponding to the first channel state parameter, the communication apparatus determines, based on the channel state parameter corresponding to the terminal apparatus that is in the second multicast group, the minimum value of the channel state parameter corresponding to the second multicast group, and notifies the second multicast group.

According to the solution provided in this embodiment of this application, when the channel state parameter obtained through measurement is less than the minimum value of the channel state parameter corresponding to the multicast group, the receiving end in the multicast group notifies the transmitting end of the multicast information, so that the transmitting end can update the minimum value of the channel state parameter corresponding to the multicast group, and process the to-be-sent multicast information based on a current minimum value of the channel state parameter corresponding to the first multicast group, so that all receiving ends in the multicast group can successfully receive the multicast information. Further, if the receiving end is not a receiving end corresponding to the minimum value of the channel state parameter, when the channel state parameter obtained by the receiving end through measurement is greater than the minimum value of the channel state parameter, the receiving end does not feed back the channel state parameter. Alternatively, if the receiving end is a receiving end corresponding to the minimum value of the channel state parameter, when the channel state parameter obtained by the receiving end through measurement is equal to the minimum value of the channel state parameter, the receiving end does not feed back the channel state parameter. This can reduce transmission resource overheads, improve resource utilization, and reduce power consumption of the terminal apparatus.

Embodiment 2

Figure 4:
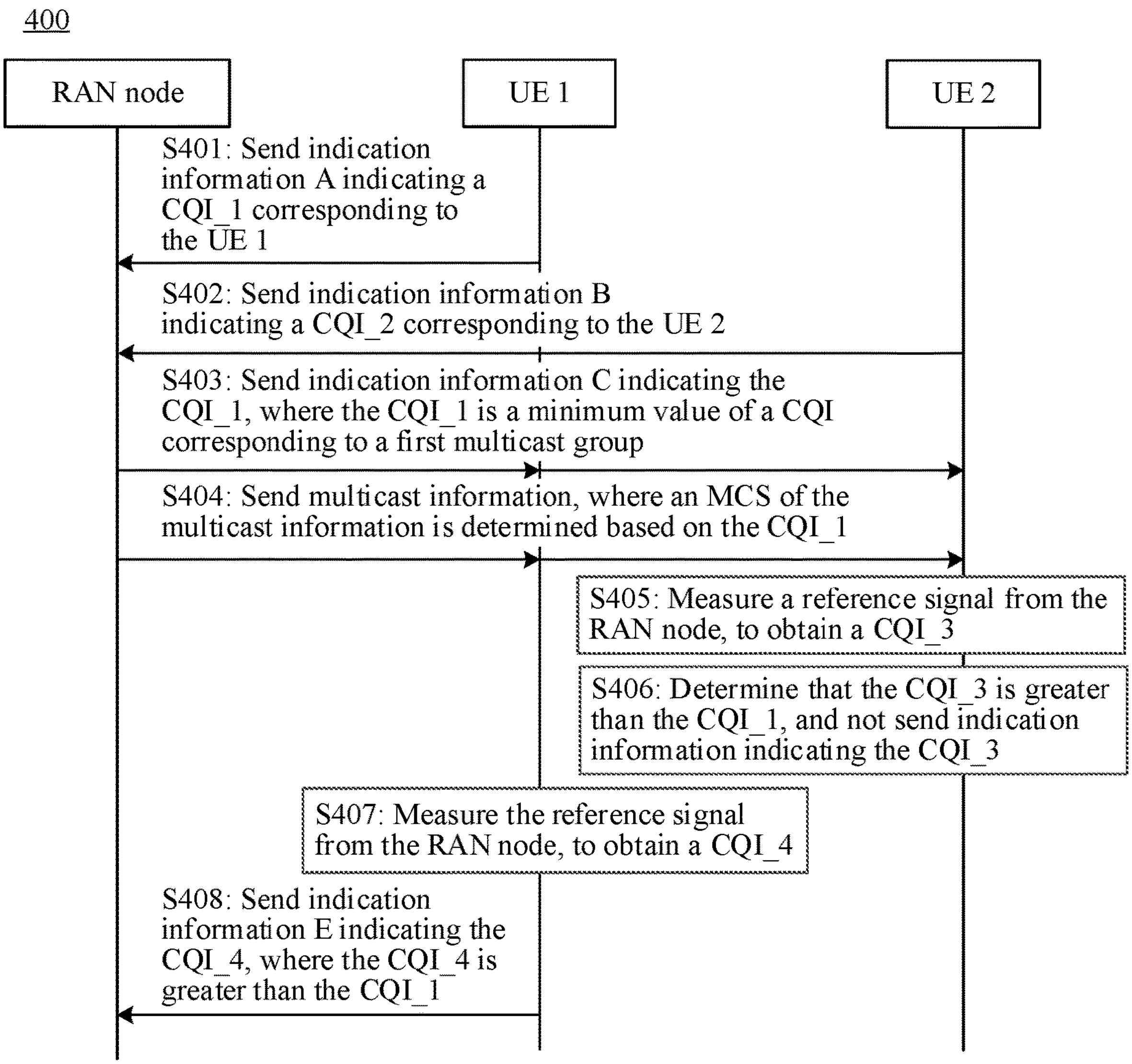
FIG. 4 is a schematic flowchart of a channel state parameter transmission method according to Embodiment 2 of this application.

FIG. 4 is a schematic flowchart of a communication method 400 according to an embodiment of this application. In the embodiment shown in FIG. 4, an example in which a communication apparatus is a RAN node or is disposed in the RAN node to implement the method provided in the embodiment shown in FIG. 4 is used for description. It should be understood that this application is not limited thereto. The RAN node in the embodiment shown in FIG. 4 may be replaced with the communication apparatus. In the embodiment shown in FIG. 4, an example in which a terminal apparatus is a UE or a terminal apparatus is disposed in a UE to implement the method provided in the embodiment shown in FIG. 4 is used for description. It should be understood that this application is not limited thereto. The UE in the embodiment shown in FIG. 4 may be replaced with the terminal apparatus. For example, in the embodiment shown in FIG. 4, a UE 1 may be replaced with a terminal apparatus 1, a UE 2 may be replaced with a terminal apparatus 2, and a UE 3 may be replaced with a terminal apparatus 3. By way of example but not limitation, the terminal apparatus may be a chip.

The RAN node shown in FIG. 4 is used as a transmitting end of multicast information of a first multicast group, and the first multicast group includes five UEs, such as the UE 1, the UE 2, the UE 3, a UE 4, and a UE 5. It should be noted that FIG. 4 shows only the UE 1 and the UE 2 that are in the first multicast group. For specific implementation of other UEs, refer to an implementation of the UE 1 or the UE 2. For brevity, details are not described herein.

Optionally, in S401, the UE 1 sends indication information A to the RAN node, where the indication information A indicates a CQI 1 corresponding to the UE 1.

Correspondingly, the RAN node receives the indication information A from the UE 1. In the embodiment shown in FIG. 4, a CQI is an example of a channel state parameter.

The UE 1 may measure a reference signal of the RAN node, to obtain the CQI_1. Specifically, the UE 1 may measure the reference signal to obtain information about a channel between the UE 1 and the RAN node, and determine, based on the channel information, the CQI_1 corresponding to the channel information. A smaller value of the CQI represents a poorer channel state, and a larger value of the CQI represents a better channel state. One CQI corresponds to one modulation scheme (for example, a modulation order) and/or one coding scheme (for example, a code rate and/or coding efficiency of channel coding).

Optionally, the indication information A may be carried in UCI sent by the UE 1 to the RAN node.

The UE 1 may send the indication information A to the RAN node after accessing the RAN node, or the UE 1 may send the indication information A to the RAN node after comparing the CQI_1 with a current minimum value of CQIs corresponding to the first multicast group.

Optionally, in S402, the UE 2 sends indication information B to the RAN node, where the indication information B indicates a CQI_2 corresponding to the UE 2.

Correspondingly, the RAN node receives the indication information B from the UE 2. The UE 2 may send the indication information B to the RAN node after accessing the RAN node, or the UE 2 may send the indication information B to the RAN node after comparing the CQI_2 with the current minimum value of the CQIs corresponding to the first multicast group.

Optionally, the indication information B may be carried in UCI sent by the UE 2 to the RAN node.

It should be noted that an execution sequence of S401 and S402 is not limited in this embodiment of this application.

S403: The RAN node sends indication information C to the first multicast group, where the indication information C indicates the CQI_1, and the CQI_1 is the minimum value of the CQIs corresponding to the first multicast group.

Correspondingly, the UEs in the first multicast group receive the indication information C.

The RAN node determines, based on indication information last sent by each UE that is in the first multicast group, a CQI corresponding to the UE that is in the first multicast group, and determines, in the CQI corresponding to the UE that is in the first multicast group, that a minimum value of the CQIs is the CQI_1.

For example, in the first multicast group, a CQI corresponding to the UE 1 is 3 (namely, the CQI_1), a CQI corresponding to the UE 2 is 5 (namely, the CQI_2), a CQI corresponding to the UE 3 is 8, a CQI corresponding to the UE 4 is 3, and a CQI corresponding to the UE 5 is 10. A minimum CQI value is 3, namely, the CQI_1. The RAN node notifies, via the indication information C, the first multicast group that a minimum CQI corresponding to the first multicast group is 3.

Optionally, the RAN node sends indication information D to the first multicast group, where the indication information D indicates a first set, and the first set includes a UE corresponding to the CQI_1.

For example, in the foregoing example, the CQI_1=3, CQIs corresponding to both the UE 1 and the UE 4 are 3, the first set corresponding to the CQI_1 includes the UE 1 and the UE 4, the RAN node may send the indication information D, and the indication information D may include identification information of the UE 1 and identification information of the UE 4. After receiving the indication information D, the UEs in the first multicast group may determine the UEs corresponding to the minimum CQI.

Optionally, the indication information C may be carried in an RRC message, a MAC CE, or DCI that is sent by the RAN node to the first multicast group.

S404: The RAN node sends the multicast information to the first multicast group, where an MCS of the multicast information is determined based on the CQI_1.

After the RAN node determines that the minimum value of the CQIs corresponding to the first multicast group is the CQI_1, the RAN node may determine, based on the CQI_1, the MCS of the multicast information to be sent to the first multicast group.

For example, a modulation scheme corresponding to the CQI_1 is 16 QAM in quadrature amplitude modulation (quadrature amplitude modulation, QAM), and the RAN node may determine that the multicast information may use a 16 QAM modulation scheme, so that a UE in a worst channel state in the first multicast group can receive the multicast information. Alternatively, the RAN node may determine to select a modulation scheme with a smaller modulation order for the multicast information, to improve an anti-channel interference capability of the multicast information. However, this application is not limited thereto.

S405: The UE 2 measures the reference signal from the RAN node, to obtain a CQI_3.

S406: The UE 2 determines that the CQI_3 is greater than the CQI_1, and the UE 2 does not send indication information for indicating the CQI_3.

The UE 2 may determine, based on a CQI that is last sent, namely, the CQI_2, or based on the first set, that the UE 2 is not a UE corresponding to the CQI 1. The CQI_3 obtained by the UE 2 through measurement is greater than the CQI_2. Because the minimum CQI corresponding to the first multicast group does not change, the UE 2 does not send the indication information for indicating the CQI_3. This can reduce transmission resource overheads, improve resource utilization, and reduce power consumption of the UE 2.

If one CQI obtained by the UE 2 through measurement is less than or equal to the CQI_1, the UE 2 sends indication information to the RAN node to indicate the CQI. If the CQI is less than the CQI_1, the RAN node may re-determine the minimum CQI of the first multicast group, and notify the first multicast group. If the CQI is equal to the CQI_1, the RAN node may update the UEs corresponding to the minimum CQI. Optionally, the first multicast group may be notified of a UE set corresponding to an updated minimum CQI.

S407: The UE 1 measures the reference signal from the RAN node, to obtain a CQI_4.

S408: The UE 1 sends indication information E to the RAN node, where the indication information E indicates the CQI_4.

The CQI_4 is greater than the CQI_1. Correspondingly, the RAN node receives the indication information E from the UE 1.

The UE 1 may determine, based on a CQI that is last sent, namely, the CQI_1, or based on the first set, that the UE 1 is a UE corresponding to the CQI 1. When the CQI_4 obtained by the UE 1 through measurement is greater than the CQI_1, the UE 1 sends the indication information E to the RAN node, to notify the RAN node that the CQI corresponding to the UE 1 is changed to the CQI_4.

If a CQI obtained by the UE 1 through measurement is less than the CQI_1, the UE 1 also sends indication information to the RAN node. In other words, when a CQI of the UE corresponding to the minimum CQI changes, the UE notifies the RAN node, so that the RAN node determines whether to update the minimum CQI corresponding to the first multicast group.

Figure 5:
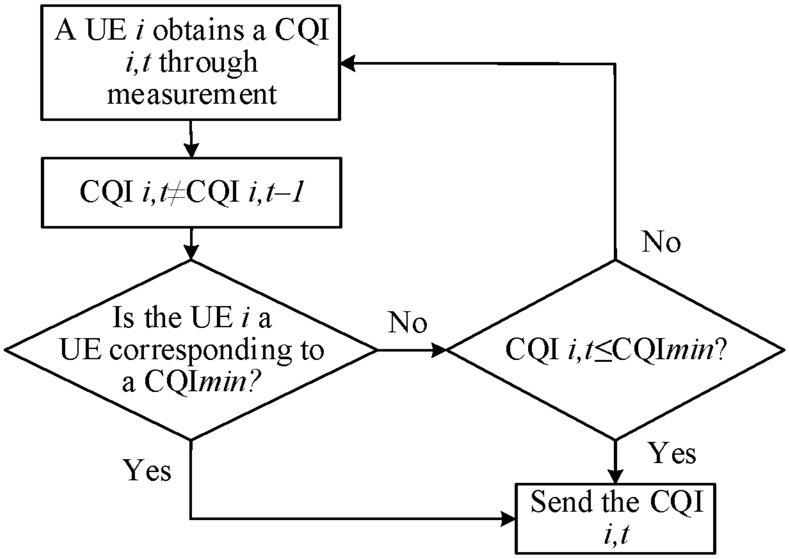
FIG. 5 is a schematic flowchart in which a UE determines whether to feed back a channel state parameter according to an embodiment of this application.

In conclusion, a procedure in which the UE in the multicast group determines whether to send an updated CQI may be shown in FIG. 5. A UE i obtains a CQI i,t through measurement, and the CQI i,t represents a CQI obtained by the UE i through $t^{th}$ measurement. When the CQI i,t is different from a CQI i,t−1 obtained through previous measurement, in other words, the CQI obtained by the UE i through measurement changes, if the UE i is the UE corresponding to the minimum CQI, namely, a CQImin, the UE i sends a CQI i; or if the UE i is not a UE corresponding to a CQImin, if a CQI i≤the CQImin, the UE i sends the CQI i; or if a CQI i>the CQImin, the UE does not send the CQI i.

After receiving the indication information E, the RAN node determines that the CQI corresponding to the UE 1 is changed to the CQI_4.

In an implementation, the RAN node determines, based on current CQIs corresponding to the first multicast group, the minimum value of the CQIs corresponding to the first multicast group. If the minimum value is not the CQI_1, the RAN node sends indication information to the first multicast group, to indicate an updated minimum value of CQIs corresponding to the first multicast group. If the minimum value is still the CQI_1, the RAN node does not send indication information to the first multicast group, and does not update the minimum value of the CQIs corresponding to the first multicast group.

In another implementation, the RAN node stores the first set, namely, a UE set corresponding to the CQI_1. For example, the first set includes the UE 1 and the UE 4. After receiving the indication information E, the RAN node determines that the CQI corresponding to the UE 1 is changed to the CQI_4. The first set is not an empty set after the RAN node removes the UE 1 from the first set. In this case, the RAN node determines that the minimum CQI corresponding to the first multicast group does not change.

If the first set becomes an empty set after the UE 1 is removed from the first set, the RAN node determines, based on CQIs currently corresponding to the first multicast group, a minimum CQI corresponding to the first multicast group, and determines a UE set corresponding to the minimum CQI. Optionally, the RAN node sends, to the first multicast group, the UE set corresponding to the minimum CQI.

After the RAN node receives the CQI i from the UE i, if the CQI i<the CQImin, the RAN node updates the CQImin, and notifies the first multicast group;

if the CQI i=the CQImin, the RAN node adds a UE corresponding to the CQImin, where for example, if the RAN node stores a UE set corresponding to the CQImin, the RAN node adds the UE i to the UE set; or if the CQI i>the CQImin, in an implementation, the RAN node determines an updated CQImin based on the current CQI corresponding to the first multicast group; or in another implementation, the RAN node stores a UE set corresponding to the CQImin, and the RAN node deletes the UE i from the UE set, where if the UE set is not empty, the CQImin does not change; or if the UE set is empty, the RAN node updates the CQImin, and notifies the first multicast group of the UE set corresponding to the CQImin, where optionally, the RAN node notifies the first multicast group of a UE set corresponding to an updated CQImin.

The following describes an operation of the RAN node when a UE included in the first multicast group changes.

When the UE in the first multicast group leaves the multicast group, the RAN node removes the UE from the first multicast group to obtain the second multicast group. The second multicast group includes a plurality of UEs.

The RAN node determines whether the UE is a UE corresponding to the minimum CQI (where for example, a current minimum CQI is the CQI_1). If the UE is the UE corresponding to the minimum CQI, the following implementations may be used, but not limited thereto.

In an implementation, the RAN node determines, based on current CQIs corresponding to the UEs that are in the second multicast group, a minimum CQI corresponding to the second multicast group. If the minimum CQI is not the CQI_1, the RAN node notifies the second multicast group. If the minimum CQI is still the CQI_1, the RAN node does not need to notify the second multicast group.

In another implementation, the RAN node stores a UE set corresponding to the CQI_1, for example, the first set. If a UE that leaves the multicast group does not belong to the first set, the RAN node determines that a minimum CQI corresponding to the second multicast group is still the CQI_1. If the UE that leaves the multicast group belongs to the first set, the RAN node deletes the UE from the first set. If the first set is not empty after the UE is deleted, the minimum CQI corresponding to the second multicast group is still the CQI_1. If the first set is empty after the UE is deleted from the first set, the RAN node determines, based on CQIs corresponding to the UEs that are in the second multicast group, the minimum CQI corresponding to the second multicast group, and notifies the second multicast group. The RAN node may further determine the UE set corresponding to the minimum CQI. Optionally, the RAN node may notify the second multicast group of the UE set corresponding to the minimum CQI.

For example, in five UEs in the first multicast group, the UE 4 leaves the first multicast group, and the RAN node removes the UE from the first multicast group to obtain the second multicast group. The second multicast group includes the UE 1, the UE 2, the UE 3, and the UE 5. For example, if the UE set that corresponds to the minimum CQI and that is stored in the RAN node includes the UE 1 and the UE 4, the UE set is not empty after the RAN node removes the UE 4 from the UE set. In this case, the minimum CQI of the second multicast group is still the minimum CQI corresponding to the UE 1. However, if the UE set that corresponds to the minimum CQI and that is stored in the RAN node includes only the UE 4, the set becomes an empty set after the RAN node deletes the UE 4 from the UE set. In this case, the RAN node determines a minimum CQI based on CQIs currently corresponding to the UE 1, the UE 2, the UE 3, and the UE 5 that are in the second multicast group. For example, a CQI corresponding to the UE 1 is 7, a CQI corresponding to the UE 2 is 5, a CQI corresponding to the UE 3 is 5, and a CQI corresponding to the UE 5 is 8. In this case, the RAN node determines that the minimum CQI corresponding to the second multicast group is 5, and a UE set corresponding to the minimum CQI is {the UE 2, the UE 3}. The RAN node may notify the second multicast group that the minimum CQI corresponding to the second multicast group is 5. Optionally, the RAN node further notifies the second multicast group that the UE set corresponding to the minimum CQI includes the UE 2 and the UE 3.

When one UE newly joins the first multicast group, the RAN node adds the UE to the first multicast group to obtain a third multicast group. The RAN node receives indication information that is for indicating a CQI and that is sent by the UE, and determines the CQI corresponding to the UE. If the CQI corresponding to the UE is less than the minimum CQI corresponding to the first multicast group (where for example, the minimum CQI is the CQI_1), the RAN node determines the CQI corresponding to the UE as a minimum CQI corresponding to the third multicast group, and notifies the third multicast group. If the CQI corresponding to the UE is greater than or equal to the CQI_1, the RAN node determines that a minimum CQI corresponding to the third multicast group is the CQI_1, and notifies the UE of the minimum CQI corresponding to the third multicast group.

Embodiment 3

Figure 6:
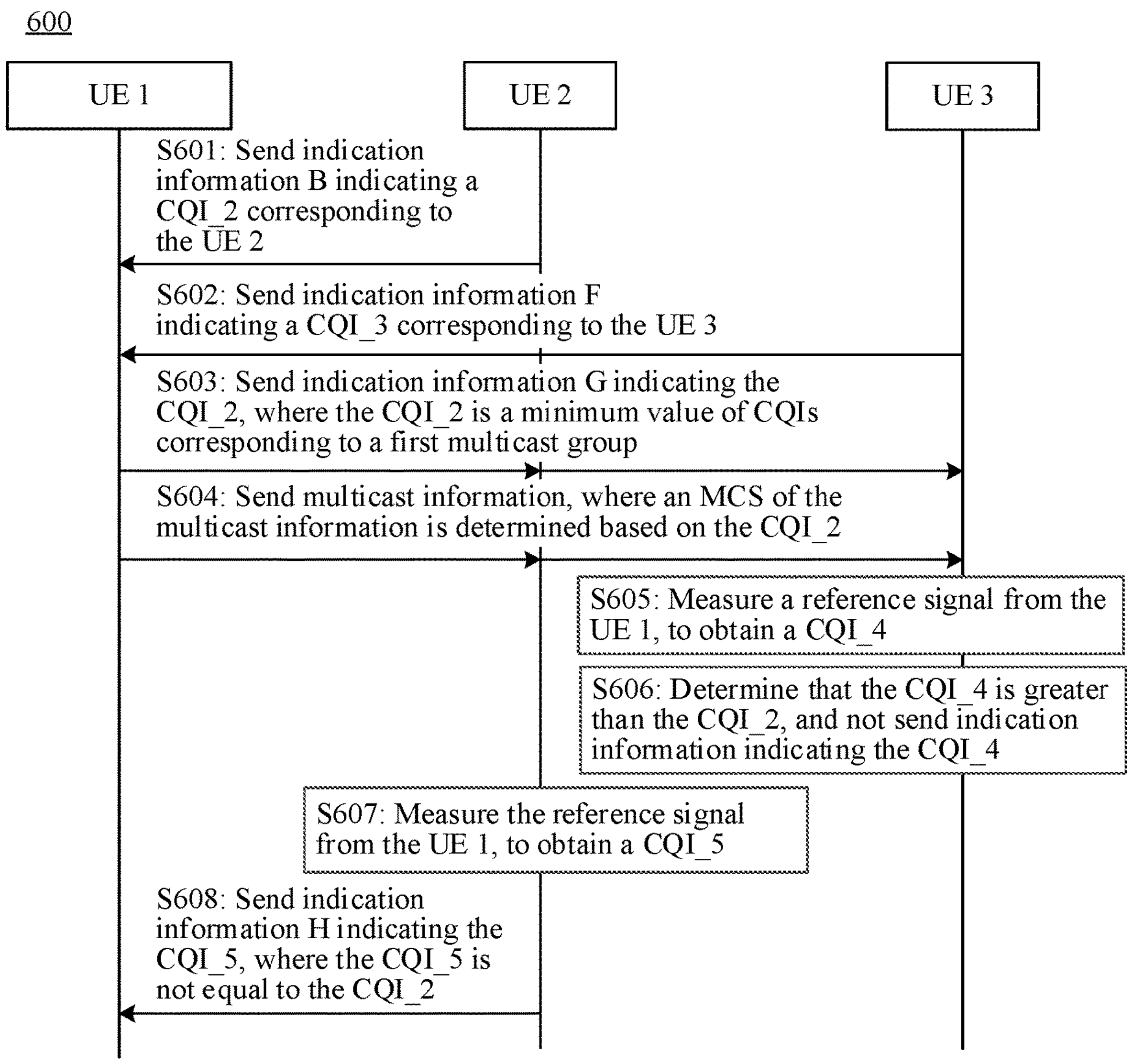
FIG. 6 is a schematic flowchart of a channel state parameter transmission method according to Embodiment 3 of this application.

FIG. 6 is a schematic flowchart of a communication method 600 according to an embodiment of this application. In the embodiment shown in FIG. 6, an example in which a terminal apparatus includes a UE or a terminal apparatus is disposed in a UE to implement the method provided in the embodiment shown in FIG. 4 is used for description. It should be understood that this application is not limited thereto. The UE in the embodiment shown in FIG. 6 may be replaced with the terminal apparatus. For example, in the embodiment shown in FIG. 4, a UE 1 may be replaced with a terminal apparatus 1, a UE 2 may be replaced with a terminal apparatus 2, and a UE 3 may be replaced with a terminal apparatus 3. By way of example but not limitation, the terminal apparatus may be a chip. The communication method shown in FIG. 6 may be applied to a V2X scenario. The UE 1 is used as a transmitting end of multicast information of a first multicast group, and the first multicast group includes five UEs, such as the UE 1, the UE 2, the UE 3, a UE 4, and a UE 5. It should be noted that FIG. 6 shows only the UE 1, the UE 2, and the UE 3 in the first multicast group. For specific implementation of other UEs, refer to an implementation of the UE 2 or the UE 3. For brevity, details are not described herein.

Optionally, in S601, the UE 2 sends indication information B to the UE 1, where the indication information B indicates a CQI_2 corresponding to the UE 2.

Correspondingly, the UE 1 receives the indication information B from the UE 2.

Optionally, in S602, the UE 3 sends indication information F to the UE 1, where the indication information F indicates a CQI_3 corresponding to the UE 3.

Correspondingly, the UE 1 receives the indication information F from the UE 3.

By way of example but not limitation, indication information (for example, the indication information B and the indication information F) for indicating a CQI corresponding to a UE may be carried in SCI or on a PSSCH.

S603: The UE 1 sends indication information G to the UEs that are in the first multicast group, where the indication information G indicates the CQI_2, and the CQI_2 is a minimum value of CQIs corresponding to the first multicast group.

Correspondingly, the UEs in the first multicast group receive the indication information G from the UE 1.

By way of example but not limitation, the indication information G is carried in an SL RRC message, a MAC CE, or SCI sent by the UE 1. Optionally, the indication information G is multicast information.

S604: The UE 1 sends the multicast information to the first multicast group, where an MCS of the multicast information is determined based on the CQI_2.

After the RAN node determines that the minimum value of the CQIs corresponding to the first multicast group is the CQI_2, the RAN node may determine, based on the CQI_2, the MCS of the multicast information sent to the first multicast group.

The multicast information may include but is not limited to multicast service data and/or SCI (for example, first-level SCI).

S605: The UE 3 measures a reference signal from the UE 1, to obtain a CQI_4.

S606: The UE 3 determines that the CQI_4 is greater than the CQI_2, and the UE 3 does not send indication information for indicating the CQI_4.

The UE 3 may determine, based on a CQI newly sent or based on a UE set corresponding to the minimum CQI indicated by the UE 1, that the UE 3 is not a UE corresponding to the minimum CQI (namely, the CQI_2).

When the CQI obtained through measurement is greater than the CQI_2, the UE 3 does not send the indication information for indicating the CQI; or when the CQI obtained through measurement is less than or equal to the CQI_2, the UE 3 sends the indication information for indicating the CQI.

S607: The UE 2 measures the reference signal from the UE 1, to obtain a CQI_5.

S608: The UE 2 sends indication information H to the UE 1, where the indication information H indicates the CQI_5, and the CQI_5 is not equal to the CQI_2.

Correspondingly, the UE 1 receives the indication information H from the UE 2.

The UE 2 may determine, based on a CQI newly sent or based on the UE set corresponding to the minimum CQI indicated by the UE 1, that the UE 2 is a UE corresponding to the minimum CQI (namely, the CQI_2). When the CQI obtained through measurement is not equal to the CQI_2, the UE 3 sends the indication information for indicating the CQI; or when the CQI obtained through measurement is equal to the CQI_2, the UE 3 does not send the indication information for indicating the CQI.

A UE that receives the multicast information and that is in the first multicast group may determine, in a procedure shown in FIG. 5, whether to send a CQI obtained through measurement. However, this application is not limited thereto.

After the UE 1 receives indication information that is for indicating the CQI and that is from one UE, refer to an operation procedure of the communication apparatus in Embodiment 1 or the RAN node in Embodiment 2. For brevity, details are not described herein again.

According to the solution provided in this embodiment of this application, when a channel state parameter obtained through measurement is less than a minimum value of the channel state parameter corresponding to a multicast group, a receiving end in the multicast group notifies the transmitting end of the multicast information, so that the transmitting end can update the minimum value of the channel state parameter corresponding to the multicast group, and process the to-be-sent multicast information based on a current minimum value of the channel state parameter corresponding to the first multicast group, so that all receiving ends in the multicast group can successfully receive the multicast information. Further, if the receiving end is not a receiving end corresponding to the minimum value of the channel state parameter, when the channel state parameter obtained by the receiving end through measurement is greater than the minimum value of the channel state parameter, the receiving end does not feed back the channel state parameter. Alternatively, if the receiving end is a receiving end corresponding to the minimum value of the channel state parameter, when the channel state parameter obtained by the receiving end through measurement is equal to the minimum value of the channel state parameter, the receiving end does not feed back the channel state parameter. This can reduce transmission resource overheads, improve resource utilization, and reduce power consumption of the terminal apparatus.

It should be noted that step numbers shown in FIG. 3, FIG. 4, and FIG. 6 in the flowcharts provided in embodiments of this application do not limit an execution sequence of the steps. An execution sequence of the steps in embodiments of this application is determined by a logical relationship between the steps. The foregoing embodiments may be implemented separately, or may be implemented in a manner of mutual combination. Same or similar concepts or processes may be mutually referenced, and may not be described in detail in some embodiments.

The methods provided in embodiments of this application are described in detail above with reference to FIG. 3 to FIG. 6. The following describes in detail the communication apparatus and the communication device provided in embodiments of this application with reference to FIG. 7 to FIG. 9. To implement functions in the methods provided in the foregoing embodiments of this application, each network element may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 7:
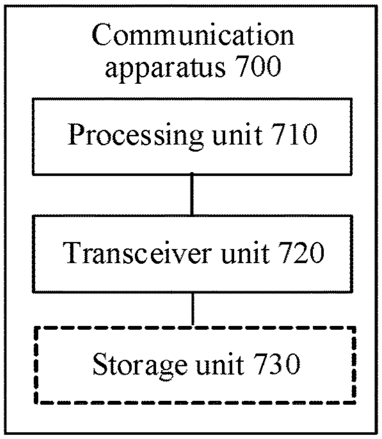
FIG. 7 is a schematic block diagram of a communication apparatus according to an embodiment of this application.

FIG. 7 is a schematic block diagram of a communication apparatus according to an embodiment of this application. As shown in FIG. 7, the communication apparatus 700 may include a transceiver unit 720.

In a possible design, the communication apparatus 700 may correspond to the terminal apparatus in the foregoing method embodiments, and the communication apparatus 700 may be a terminal device or an apparatus, for example, a chip, disposed in the terminal device.

It should be understood that the communication apparatus 700 may correspond to the terminal apparatus in the methods in the foregoing embodiments of this application, and the communication apparatus 700 may include units configured to perform the methods performed by the terminal apparatus in the methods in FIG. 3 to FIG. 6. In addition, the units in the communication apparatus 700 and the foregoing other operations and/or functions are separately used to implement corresponding procedures of the methods in FIG. 3 to FIG. 6.

Optionally, the communication apparatus 700 may further include a processing unit 710. The processing unit 710 may be configured to process instructions or data, to implement a corresponding operation.

It should be further understood that when the communication apparatus 700 is the chip disposed (or used) in the terminal device, the transceiver unit 720 in the communication apparatus 700 may be an input/output interface or a circuit of the chip, and the processing unit 710 in the communication apparatus 700 may be a processor in the chip.

Optionally, the communication apparatus 700 may further include a storage unit 730. The storage unit 730 may be configured to store instructions or data. The processing unit 710 may execute the instructions or the data stored in the storage unit, to enable the communication apparatus to implement a corresponding operation.

It should be further understood that a specific process in which the units perform the foregoing corresponding steps is described in detail in the foregoing method embodiments. For brevity, details are not described herein again.

In another possible design, the communication apparatus 700 may correspond to the communication apparatus in the foregoing method embodiments. The communication apparatus 700 may be a communication device or an apparatus, for example, a chip, disposed in the communication device. The communication device may be a terminal device or a network device.

It should be understood that the communication apparatus 700 may correspond to the communication apparatus in the methods in the foregoing embodiments of this application, and the communication apparatus 700 may include units configured to perform the methods performed by the communication apparatus in the methods in FIG. 3 to FIG. 6. In addition, the units in the communication apparatus 700 and the foregoing other operations and/or functions are separately used to implement corresponding procedures of the methods in FIG. 3 to FIG. 6.

Optionally, the communication apparatus 700 may further include a processing unit 710. The processing unit 710 may be configured to process instructions or data, to implement a corresponding operation.

It should be further understood that when the communication apparatus 700 is the chip disposed (or used) in the communication device, the transceiver unit 720 in the communication apparatus 700 may be an input/output interface or a circuit of the chip, and the processing unit 710 in the communication apparatus 700 may be a processor in the chip.

Optionally, the communication apparatus 700 may further include a storage unit 730. The storage unit 730 may be configured to store instructions or data. The processing unit 710 may execute the instructions or the data stored in the storage unit, to enable the communication apparatus to implement a corresponding operation.

It should be further understood that a specific process in which the units perform the foregoing corresponding steps is described in detail in the foregoing method embodiments. For brevity, details are not described herein again.

Figure 8:
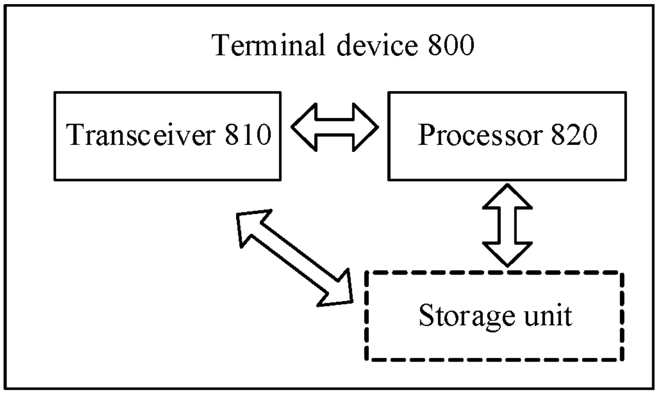
FIG. 8 is a schematic diagram of a structure of a terminal device according to an embodiment of this application.

It should be understood that the transceiver unit 720 in the communication apparatus 700 may be implemented through a communication interface (for example, a transceiver or an input/output interface), for example, may correspond to a transceiver 810 in a terminal device 800 shown in FIG. 8. The processing unit 710 in the communication apparatus 700 may be implemented by at least one processor, for example, may correspond to a processor 820 in the terminal device 800 shown in FIG. 8. The processing unit 710 in the communication apparatus 700 may further be implemented by at least one logic circuit. The storage unit 730 in the communication apparatus 700 may correspond to a memory in the terminal device 800 shown in FIG. 8.

Figure 9:
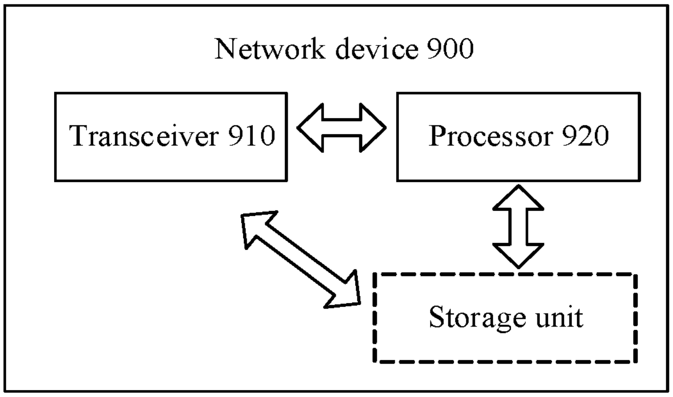
FIG. 9 is a schematic diagram of a structure of a network device according to an embodiment of this application.

It should be understood that when the communication apparatus 700 is a network device, the transceiver unit 720 in the communication apparatus 700 may be implemented through a communication interface (for example, a transceiver or an input/output interface), for example, may correspond to a transceiver 910 in a network device 900 shown in FIG. 9. The processing unit 710 in the communication apparatus 700 may be implemented by at least one processor, for example, may correspond to a processor 920 in the network device 900 shown in FIG. 9. The processing unit 710 in the communication apparatus 700 may be implemented by at least one logic circuit.

FIG. 8 is a schematic diagram of a structure of a terminal device 800 according to an embodiment of this application. The terminal device 800 may be used in the system shown in FIG. 1, to perform functions of the terminal apparatus or the communication apparatus in the foregoing method embodiments. As shown in the figure, the terminal device 800 includes a processor 820 and a transceiver 810. Optionally, the terminal device 800 further includes a memory. The processor 820, the transceiver 810, and the memory may communicate with each other through an internal connection path, to transfer a control signal and/or a data signal. The memory is configured to store a computer program, and the processor 820 is configured to execute the computer program in the memory, to control the transceiver 810 to receive and send a signal.

The processor 820 and the memory may be integrated into one processing apparatus, and the processor 820 is configured to execute program code stored in the memory to implement the foregoing functions. During specific implementation, the memory may alternatively be integrated into the processor 820, or may be independent of the processor 820. The processor 820 may correspond to the processing unit in FIG. 7.

The transceiver 810 may correspond to the transceiver unit in FIG. 7. The transceiver 810 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 800 shown in FIG. 8 can implement processes related to the terminal apparatus in the method embodiments shown in FIG. 3 to FIG. 6. Operations and/or functions of the modules in the terminal device 800 are separately intended to implement corresponding procedures in the foregoing method embodiments. For details, refer to the descriptions in the foregoing method embodiments. To avoid repetition, detailed descriptions are properly omitted herein.

The processor 820 may be configured to perform an action that is implemented inside the terminal apparatus and that is described in the foregoing method embodiments, and the transceiver 810 may be configured to perform an action of sending or receiving that is described in the foregoing method embodiments. For details, refer to the descriptions in the foregoing method embodiments. Details are not described herein again.

Optionally, the terminal device 800 may further include a power supply, configured to supply power to various components or circuits in the terminal device.

In addition, to make functions of the terminal device more perfect, the terminal device 800 may further include an input/output apparatus, for example, include one or more of an input unit, a display unit, an audio circuit, a camera, a sensor, and the like, and the audio circuit may further include a speaker, a microphone, and the like.

FIG. 9 is a schematic diagram of a structure of a network device according to an embodiment of this application. The network device 900 may be used in the system shown in FIG. 1, to perform functions of the communication apparatus in the foregoing method embodiments. As shown in FIG. 9, the network device 900 includes a processor 920 and a transceiver 910. Optionally, the network device 900 further includes a memory. The processor 920, the transceiver 910, and the memory may communicate with each other through an internal connection path, to transfer a control signal and/or a data signal. The memory is configured to store a computer program, and the processor 920 is configured to execute the computer program in the memory, to control the transceiver 910 to receive and send a signal.

The processor 920 and the memory may be integrated into one processing apparatus, and the processor 920 is configured to execute program code stored in the memory to implement the foregoing functions. During specific implementation, the memory may alternatively be integrated into the processor 820, or may be independent of the processor 920. The processor 920 may correspond to the processing unit in FIG. 7.

The transceiver 910 may correspond to the transceiver unit in FIG. 7. The transceiver 910 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the network device 900 shown in FIG. 9 can implement processes related to the communication apparatus in the method embodiments shown in FIG. 3 to FIG. 6. Operations and/or functions of modules in the network device 900 are separately intended to implement corresponding procedures in the foregoing method embodiments. For details, refer to the descriptions in the foregoing method embodiments. To avoid repetition, detailed descriptions are properly omitted herein.

The processor 920 may be configured to perform an action that is implemented inside the communication apparatus and that is described in the foregoing method embodiments, and the transceiver 910 may be configured to perform an action of sending or receiving that is described in the foregoing method embodiments. For details, refer to the descriptions in the foregoing method embodiments. Details are not described herein again.

An embodiment of this application further provides a processing apparatus, and the processing apparatus includes a processor and a (communication) interface. The processor is configured to perform the method according to any one of the foregoing method embodiments.

It should be understood that the processing apparatus may be one or more chips. For example, the processing apparatus may be a field programmable gate array (field programmable gate array, FPGA), an application-specific integrated chip (application-specific integrated circuit, ASIC), a system-on-a-chip (system-on-a-chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip.

According to the methods provided in embodiments of this application, this application further provides a computer program product. The computer program product includes computer program code. When the computer program code is executed by one or more processors, an apparatus including the processor is enabled to perform the methods in embodiments shown in FIG. 3 to FIG. 6.

The technical solutions provided in this embodiment of this application may be fully or partially implemented through software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, a network device, a terminal device, a core network device, a machine learning device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium, or the like.

According to the methods provided in embodiments of this application, this application further provides a computer-readable storage medium. The computer-readable storage medium stores program code. When the program code is run by one or more processors, an apparatus including the processor is enabled to perform the methods in embodiments shown in FIG. 3 to FIG. 6.

According to the method provided in embodiments of this application, this application further provides a system, including the foregoing plurality of terminal apparatuses. The system may further include one or more of the foregoing communication apparatuses.

In the several embodiments provided in this application, it is understood that the disclosed system, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing descriptions are merely specific implementations of this application, but are not intended to limit the protection scope of this application. Any variation or replacement readily figured out by a person skilled in the art in the technical scope disclosed in this application shall fall in the protection scope of this application. Therefore, the protection scope of this application shall be subject to the protection scope of the claims.

What is claimed is:

1. A communication method, comprising:

receiving, by a first terminal apparatus from a communication apparatus, first indication information indicating a first channel state parameter, wherein the first channel state parameter is a minimum value of a channel state parameter corresponding to a first multicast group, the first multicast group comprises a plurality of terminal apparatuses that receive same multicast information and include the first terminal apparatus;

measuring, by the first terminal apparatus, a reference signal from the communication apparatus, to obtain a second channel state parameter; and sending, by the first terminal apparatus, second indication information to the communication apparatus if the second channel state parameter is less than the first channel state parameter, wherein the second indication information indicates the second channel state parameter.

2. The method of claim 1, the method further comprising:

skipping sending, by the first terminal apparatus, the second indication information to the communication apparatus if the second channel state parameter is greater than the first channel state parameter; and/or sending, by the first terminal apparatus, the second indication information to the communication apparatus if the second channel state parameter is equal to the first channel state parameter.

3. The method of claim 1, the method further comprising:

receiving, by the first terminal apparatus from the communication apparatus, third indication information indicating a first set of a terminal apparatus corresponding to the first channel state parameter, wherein the first set of the terminal apparatus is at least part of the first multicast group, and the first set does not comprise the first terminal apparatus.

4. The method of claim 1, before the receiving the first indication information from the communication apparatus, the method further comprising:

sending, by the first terminal apparatus to the communication apparatus, fourth indication information indicating a channel state parameter that corresponds to the first terminal apparatus and that is obtained through measurement.

5. The method of claim 1, the method further comprising:

sending, by the first terminal apparatus, the second indication information to the communication apparatus if the second channel state parameter is greater than the first channel state parameter; and/or skipping sending, by the first terminal apparatus, the second indication information to the communication apparatus if the second channel state parameter is equal to the first channel state parameter.

6. The method of claim 5, the method further comprising:

receiving, by the first terminal apparatus from the communication apparatus, fifth indication information indicating a second set of a terminal apparatus corresponding to the first channel state parameter, wherein the second set is at least part of the first multicast group, and the second set comprises the first terminal apparatus.

7. The method of claim 5, before the receiving the first indication information from a communication apparatus, the method further comprising:

sending, by the first terminal apparatus to the communication apparatus, sixth indication information, wherein the sixth indication information indicates the first channel state parameter, and the first channel state parameter is a channel state parameter that corresponds to the first terminal apparatus and that is obtained through measurement.

8. A communication method, comprising:

sending first indication information to a first multicast group, wherein the first indication information indicates a first channel state parameter, the first channel state parameter is a minimum value of a channel state parameter corresponding to the first multicast group, and the first multicast group comprises a plurality of terminal apparatuses that receive same multicast information; and receiving second indication information from a first terminal apparatus of the plurality of terminal apparatuses, wherein the second indication information indicates a second channel state parameter that is less than the first channel state parameter.

9. The method of claim 8, before the sending first indication information to the first multicast group, the method further comprising:

receiving a plurality of pieces of indication information from the first multicast group, wherein the plurality of pieces of indication information includes information indicating a channel state parameter corresponding to a terminal apparatus of the first multicast group, and the first channel state parameter is a minimum value of channel state parameters indicated by the plurality of pieces of indication information.

10. The method of claim 9, wherein the plurality of pieces of indication information comprises fourth indication information from the first terminal apparatus, the fourth indication information indicates a third channel state parameter, and the method further comprises:

sending third indication information to the first terminal apparatus, wherein the third indication information indicates a first set of a terminal apparatus corresponding to the first channel state parameter, the first set is at least part of the first multicast group and does not comprise the first terminal apparatus.

11. The method of claim 9, wherein the plurality of pieces of indication information comprises sixth indication information from the first terminal apparatus, the sixth indication information indicates the first channel state parameter, and the method further comprises:

sending fifth indication information to the first terminal apparatus, wherein the fifth indication information indicates a second set of a terminal apparatus corresponding to the first channel state parameter, the second set is at least part of the first multicast group and comprises the first terminal apparatus.

12. The method of claim 8, the method further comprising:

determining a second multicast group based on the first multicast group, wherein the first multicast group comprises the second multicast group, and the second multicast group does not comprise a second terminal apparatus of the first multicast group; and determining based on a channel state parameter corresponding to a terminal apparatus of the second multicast group, wherein a minimum value of the channel state parameter corresponding to the second multicast group, if a channel state parameter corresponding to the second terminal apparatus is the minimum value of the channel state parameter corresponding to the first multicast group, and the terminal apparatus in the second multicast group does not correspond to the minimum value of the channel state parameter of the first multicast group.

13. An apparatus, comprising:

one or more processors configured to:

receive first indication information from a communication apparatus, wherein the first indication information indicates a first channel state parameter, the first channel state parameter is a minimum value of a channel state parameter corresponding to a first multicast group, the first multicast group comprises a plurality of terminal apparatuses that receive same multicast information, and the plurality of terminal apparatuses comprise a first terminal apparatus;

measure a reference signal from the communication apparatus, to obtain a second channel state parameter; and send second indication information to the communication apparatus when the second channel state parameter is less than the first channel state parameter, wherein the second indication information indicates the second channel state parameter.

14. The apparatus of claim 13, wherein the one or more processors is further configured to:

skip sending the second indication information to the communication apparatus when the second channel state parameter is greater than the first channel state parameter; and/or send the second indication information to the communication apparatus when the second channel state parameter is equal to the first channel state parameter.

15. The apparatus of claim 13, wherein receive third indication information from the communication apparatus, wherein the third indication information indicates a first set of a terminal apparatus corresponding to the first channel state parameter, the first multicast group comprises the first set, and the first set does not comprise the first terminal apparatus.

16. The apparatus of claim 14, wherein before receiving the first indication information from the communication apparatus, the one or more processors is further configured to:

send fourth indication information to the communication apparatus, wherein the fourth indication information indicates a channel state parameter that corresponds to the first terminal apparatus and that is obtained through measurement.

17. The apparatus of claim 13, wherein the one or more processors is further configured to:

send the second indication information to the communication apparatus when the second channel state parameter is greater than the first channel state parameter; and/or skip sending the second indication information to the communication apparatus when the second channel state parameter is equal to the first channel state parameter.

18. The apparatus of claim 17, wherein the one or more processors is further configured to:

receive fifth indication information from the communication apparatus, wherein the fifth indication information indicates a second set of a terminal apparatus corresponding to the first channel state parameter, the second set is at least part of the first multicast group and comprises the first terminal apparatus.

19. The apparatus of claim 17, wherein before receiving the first indication information from the communication apparatus, the one or more processors is further configured to: send sixth indication information to the communication apparatus, wherein the sixth indication information indicates the first channel state parameter, and the first channel state parameter is a channel state parameter that corresponds to the first terminal apparatus and that is obtained through measurement.

20. An apparatus, comprising:

one or more processors configured to:

determine a first channel state parameter, wherein the first channel state parameter is a minimum value of a channel state parameter corresponding to a first multicast group, and the first multicast group comprises a plurality of terminal apparatuses that receive same multicast information;

send first indication information to the first multicast group, wherein the first indication information indicates the first channel state parameter; and receive second indication information from a first terminal apparatus, wherein the second indication information indicates a second channel state parameter, wherein the second channel state parameter is less than the first channel state parameter, and the plurality of terminal apparatuses comprise the first terminal apparatus.

* * * * *